US008374827B2

(12) United States Patent
Hirose et al.

(10) Patent No.: US 8,374,827 B2
(45) Date of Patent: Feb. 12, 2013

(54) NUMERICAL SIMULATION APPARATUS FOR TIME DEPENDENT SCHRÖDINGER EQUATION

(75) Inventors: Kikuji Hirose, Osaka (JP); Hidekazu Goto, Osaka (JP)

(73) Assignee: Osaka University, Osaka (JP)

( * ) Notice: Subject to any disclaimer, the term of this patent is extended or adjusted under 35 U.S.C. 154(b) by 405 days.

(21) Appl. No.: 12/310,879

(22) PCT Filed: Sep. 7, 2007

(86) PCT No.: PCT/JP2007/067473
§ 371 (c)(1),
(2), (4) Date: Mar. 11, 2009

(87) PCT Pub. No.: WO2008/032646
PCT Pub. Date: Mar. 20, 2008

(65) Prior Publication Data
US 2009/0204375 A1    Aug. 13, 2009

(30) Foreign Application Priority Data
Sep. 12, 2006    (JP) ................... 2006-247367

(51) Int. Cl.
G06F 17/50 (2006.01)
G06F 7/60 (2006.01)
G06F 17/10 (2006.01)
G06F 7/48 (2006.01)

(52) U.S. Cl. ................... 703/2; 703/1; 703/6
(58) Field of Classification Search .......... 703/2, 6, 703/1
See application file for complete search history.

(56) References Cited

U.S. PATENT DOCUMENTS

| | | | | |
|---|---|---|---|---|
| 7,023,533 B2 * | 4/2006 | Golowich et al. | ........... | 356/73.1 |
| 7,038,452 B2 * | 5/2006 | Epstein et al. | ................ | 324/309 |
| 7,188,033 B2 * | 3/2007 | Mills | .............................. | 702/22 |
| 7,212,933 B2 * | 5/2007 | Kouri et al. | ..................... | 702/76 |
| 7,288,773 B2 * | 10/2007 | de Jonge et al. | ........... | 250/423 F |
| 7,398,162 B2 * | 7/2008 | Downs et al. | ................... | 702/27 |
| 7,430,051 B2 * | 9/2008 | Diebold et al. | ............... | 356/625 |
| 7,447,724 B2 * | 11/2008 | Sato | ............................. | 708/446 |
| 7,617,081 B2 * | 11/2009 | Von Winckel et al. | ............ | 703/2 |
| 2005/0021266 A1 * | 1/2005 | Kouri et al. | ..................... | 702/76 |
| 2006/0009956 A1 * | 1/2006 | Winckel et al. | .................. | 703/2 |

(Continued)

OTHER PUBLICATIONS

Baer, et al. "Accurate and efficient evolution of nonlinear Schrödinger equations", Physical Review A, vol. 62, 2000.*

(Continued)

*Primary Examiner* — Shambhavi Patel
(74) *Attorney, Agent, or Firm* — Wedneroth, Lind & Ponack, L.L.P.

(57) ABSTRACT

To provide a numerical simulation apparatus capable of executing a numerical simulation with high speed and precision by reducing computational complexity. A numerical simulation apparatus that executes a numerical simulation using a wave function which is a solution of a time dependent Schrödinger equation includes: a real time evolution calculation unit that calculates a second wave function while evolving the second wave function from an initial time in increments of a predetermined time period, the second wave function being obtained by applying a central difference approximation in a real-space finite-difference method to a first wave function expressed using a propagator, and being expressed using a Bessel function; and a calculation result storage unit that stores a calculation result of the second wave function obtained at each time by the time evolution calculation unit while evolving the second wave function in increments of the predetermined time period.

6 Claims, 11 Drawing Sheets

U.S. PATENT DOCUMENTS

2007/0081169 A1* 4/2007 Diebold et al. ............... 356/625

OTHER PUBLICATIONS

Soriano et al. "Analysis of the Finite Difference Time Domain Technique to Solve the Schrodinger Equation for Quantum Devices", Journal of Applied Physics vol. 95, No. 12 Jun. 15, 2004.*
"Nonlinear Pulse Propagation", Nov. 2005, p. 1.*
Kuska et al. "Absorbing Boundary Conditions for the Schrodinger Equation on Finite Intervals", Physical Review, vol. 46, No. 8, Aug. 1992.*
Truong et al. "A Comparative Study of Time Dependent Quantum Mechanical Wave Packet Evolution Methods", J. Chem. Phys. 96 (3), Feb. 1, 1992.*
Wang et al. "Time-dependent approach to scattering by Chebyshev-polynomial expansion and the fast-Fourier-transform algorithm", Physical Review A vol. 57, No. 5 May 1998.*
De Raedt et al. "One-step finite-difference time-domain algorithm to solve the Maxwell equations", Physical Review E 67, 056706 ~2003.*
Sun et al. "An effective algorithm for simulating acoustical wave propagation", Computer Physics Communications 151 (2003) 241-249.*
Loh et al. "Fast Chebyshev-polynomial method for simulating the time evolution of linear dynamical systems", Physical Review E, vol. 63, 056706.*
Varga, G. "Computer simulation by quantum mechanical time dependent wave packet method especially for atom / molecule—solid surface interaction", 2001.*
Lin et al. "Solution of the Time-Dependent Schrodinger Equation Employing a Basis of Explicit Discreet-Coordinate Eigenfunctions—spherical and azimuthal symmetry, adiabaticity, and multiphoton excitation of a rotating Morce Oscillator", Computer Physics Communications 63 (1991) 538-368.*
Lemoine et al. "Quantum wave packet approach to the Eley-Rideal reactive scattering between a gas phase atom and an adsorbate", Computer Physics Communications 137 (2001) 415-426.*
Leforestier et al. "A Comparison of Different Propagation Schemes for the Time Dependent Schrodinger Equation", Journal of Computational. Physics 94, 59-80 (1991).*
Lazarenkova et al. "Electron and phonon energy spectra in a three-dimensional regimented quantum dot superlattice", Physical Review B 66, 245319 ~2002.*
Hagstrom, Thomas. "Radiation boundary conditions for the numerical simulation of waves", Ada Numerica (1999), pp. 47-106.*
Gordon et al. "Numerical solver of the time-dependent Schrödinger equation with Coulomb singularities", Physical Review A 73, 042505 _2006_.*
International Search Report issued Nov. 27, 2007 in the International (PCT) Application of which the present application is the U.S. National Stage.
Kikuharu Hirose et al., "*Super Computer o Mochiita Simulation ni yoru Cho Seimitsu Kako Process no Genshi Level deno Kaiseki II*", Information Synergy Center Tohoku University Daikibo Kagaku Keisan System Koho SENAC, Dec. 2001, vol. 34, No. 3, pp. 27-35.
Akira Ukawa, "*Soryushi Butsuriqaku to Simulation—Suchiteki Hoho ni yoru Koshijo no Ba no Riron*", Mathematical Sciences, vol. 34, No. 11, Saiensu-sha Co., Ltd., Nov. 1, 1996, pp. 13-21.
K. Hirose et al., "*First-Principles Calculations in Real-Space Formalism*", Imperial College Press, London (2005).
R.P. Feynman and A.R. Hibbs, "*Quantum Mechanics and Path Integrals*", translated by Kazuo Kitahara, McGraw-Hill (Jul. 1990) and its original text (written in English).
J.R. Chelikowsky et al., "*Higher-order finite-difference pseudopotential method: An application to diatomic molecules*", Physical Review B, vol. 50, No. 16, pp. 11, 355-364, Oct. 1994.

* cited by examiner

FIG. 1
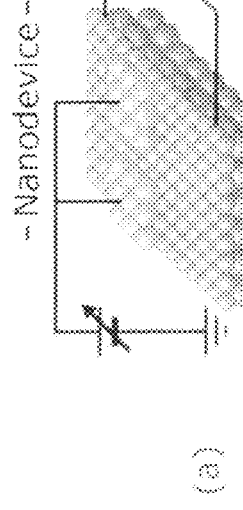
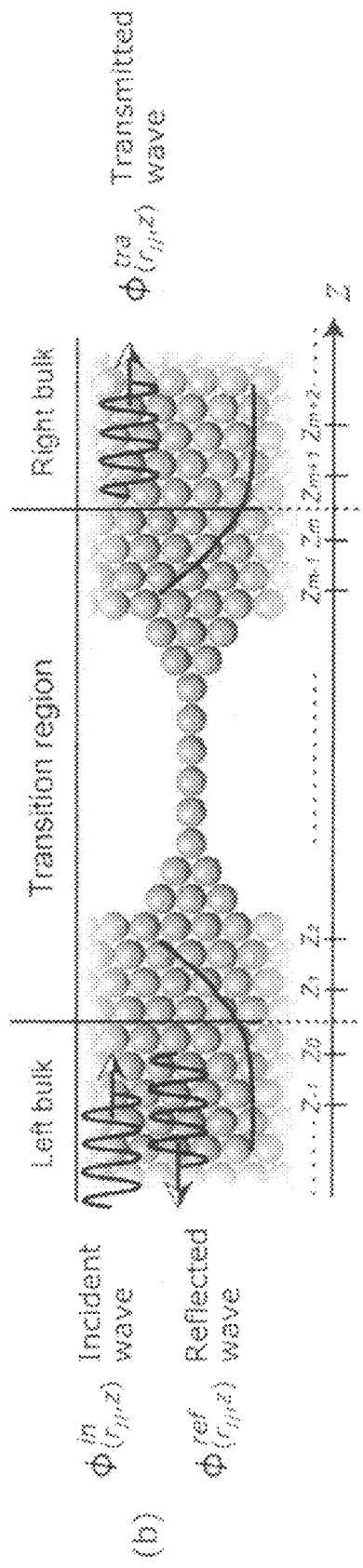

FIG. 7
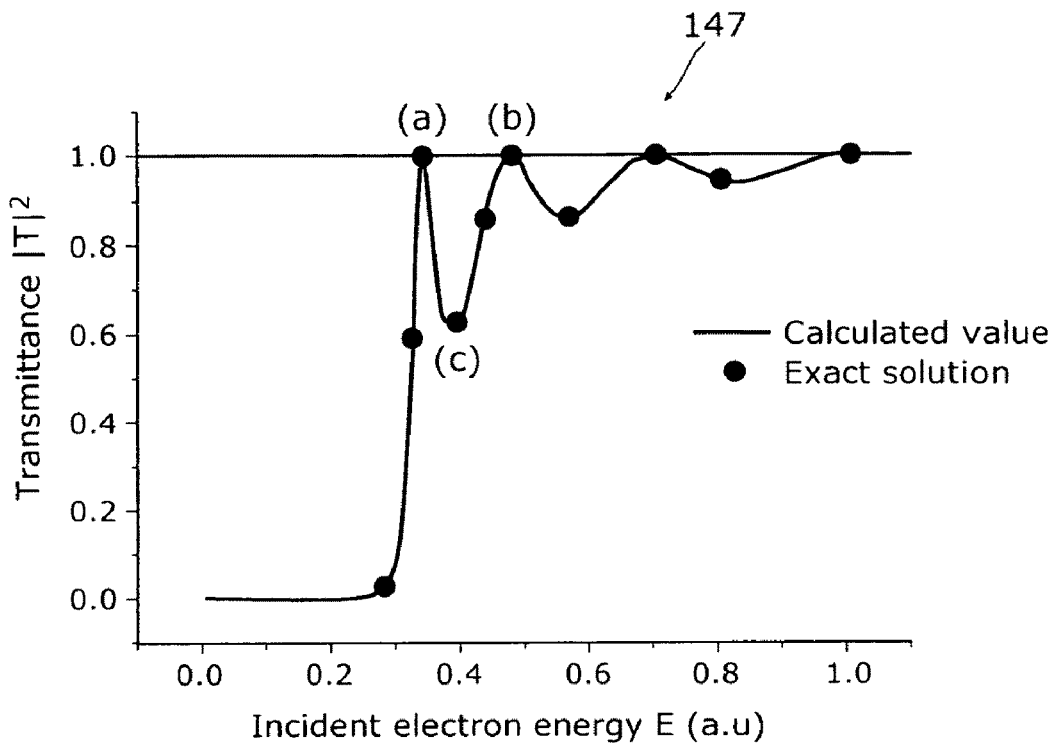
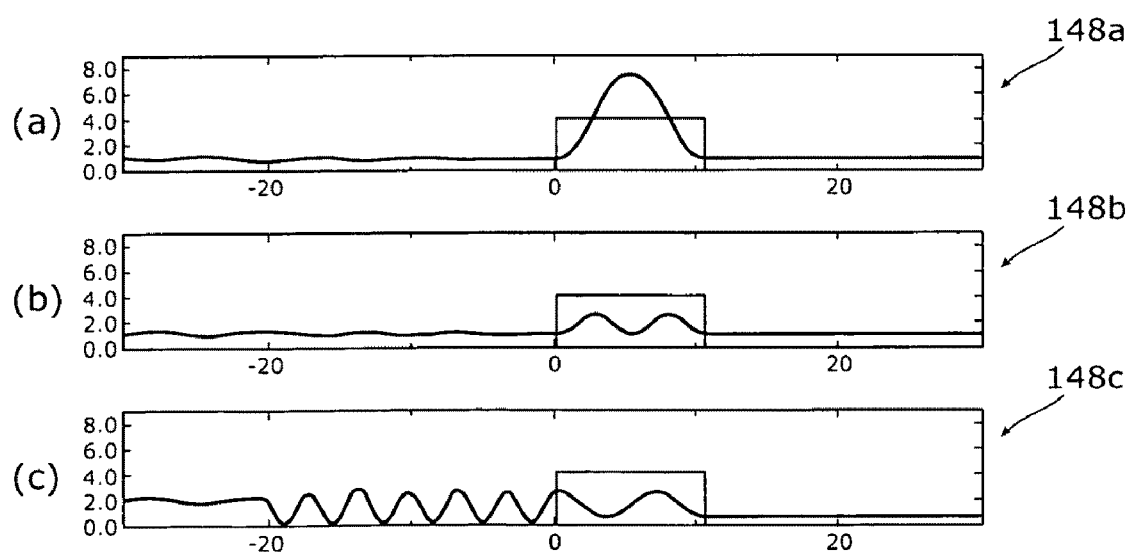

(a)

(b)

| | |
|---|---|
| Time step Δt (a.u.) | 0.2 |
| Grid width h (a.u.) | 0.4 |
| Size in x direction Lx | 4.0 |
| Number of grid points in x direction Nx | 8 |
| Size in z direction Lz | 500.0 |
| Number of grid points in z direction Nz | 100 |
| Integral upper limit T (a.u.) | 200 |
| Incident electron energy (a.u.) | 0.05~1.10 |

1 a.u. = 0.024 fs
1 a.u. = 27.211 eV
1 a.u. = 0.52918 Å

NUMERICAL SIMULATION APPARATUS FOR TIME DEPENDENT SCHRÖDINGER EQUATION

TECHNICAL FIELD

The present invention relates to a numerical simulation apparatus that is needed for developing electronic devices or quantum computers in consideration of nanoscale properties, and in particular relates to a numerical simulation apparatus capable of executing a numerical simulation with high speed and precision by reducing computational complexity.

BACKGROUND ART

In recent years, active research has been conducted on nanoscale electronic devices, quantum computers, and the like. In the case where an electronic device is a structure of a scale equal to or smaller than about 10 nm which is a mean free path of electrons, quantum effects become noticeable in electrical and magnetic properties such as electrical conductance. Thus, it is difficult to design and develop these nanoscale electronic devices and quantum computers according to an ordinary method that is based on macroscale electrical and magnetic properties. Accordingly, a numerical simulation apparatus capable of performing a numerical simulation of dynamic behavior of electrons such as scattering, transmission, reflection, interference, oscillation, attenuation, and excitation with high speed and precision is needed for the design and development of these nanoscale electronic devices and quantum computers.

For instance, with miniaturization and high integration of a nanoscale electronic device, a conduction electron path becomes an atomic size (for example, see (a) in FIG. 1). As a result, electronic transport properties specific to a nanoregion, such as ballistic conduction, appear. Therefore, in evaluations of leakage currents of silicon oxide and conduction properties of a quantum wire (for example, see (b) in FIG. 1), it is necessary to numerically simulate conduction properties using the time dependent Schrödinger equation.

In a numerical simulation of conduction properties, the steady-state Schrödinger equation for a scattering problem is typically used. This being so, various methods for numerically simulating the steady-state Schrödinger equation for a scattering problem have been proposed. One of them is the Overbridging Boundary-Matching (OBM) method which employs the real-space finite-difference method (for example, see Non-patent Reference 1).

On the other hand, there is also a method for clarifying dynamic behavior of electrons by directly solving the time dependent Schrödinger equation. In this case, the time dependent Schrödinger equation defined by the following Expression (1) is used.

[Expression 1]

$$i\frac{\partial}{\partial t}\Psi(r, t) = H\Psi(r, t) \qquad (1)$$

H is a Hamiltonian, and is given by the following Expression (2). $\Delta$ is a Laplacian, and is given by the following Expression (3). V(r, t) is a potential of an electron. Atomic units are used as a system of units. An electron mass is m=1, an elementary charge is e=1, and h/2π=1, where h is a Planck's constant.

[Expression 2]

$$H = -\frac{1}{2}\Delta + V(r, t) \qquad (2)$$

[Expression 3]

$$\Delta = \frac{\partial^2}{\partial x^2} + \frac{\partial^2}{\partial y^2} + \frac{\partial^2}{\partial z^2} \qquad (3)$$

Furthermore, expressing a solution of the above Expression (1) by a path integral using the propagator K (Feynman Kernel) leads to the following Expression (4), where $\Psi(r, t_0)$ is a wave function at initial time $t_0$.

[Expression 4]

$$\Psi(r, t) = \int_{-\infty}^{\infty} K(r, t; r', t_0)\Psi(r', t_0)d^3r' \qquad (4)$$

It is known that the above Expression (4) can be expressed by a path integral. For instance, the wave function after short time period $\Delta t$ is defined by the following Expression (5) (for example, see Non-patent Reference 2).

[Expression 5]

$$\Psi(r, t + \Delta t) = \sqrt{\frac{1}{2\pi i\Delta t}} \int_{-\infty}^{\infty} e^{i\frac{(r-r')^2}{2\Delta t}} e^{-i\Delta t V\left(\frac{r+r'}{2}, t\right)} \Psi(r', t)d^3r' \qquad (5)$$

Non-patent Reference 1: K. Hirose, T. Ono et al., First-Principles Calculations in Real-Space Formalism, Imperial College Press, London (2005)

Non-patent Reference 2: R. P. Feynman and A. R. Hibbs, Quantum Mechanics and Path Integrals, translated by Kazuo Kitahara, McGraw-Hill (July 1990)

SUMMARY OF THE INVENTION

Problems that Invention is to Solve

With the conventional calculation methods, however, only small model calculations and qualitative evaluations have been attempted so far, due to their heavy computational burdens. For example, in a numerical simulation using the above Expression (5), enormous computational complexity is required for a process of sequentially executing integration and finding a correct solution after time t. Therefore, only small models can be subject to the numerical simulation using the above Expression (5). Thus, the conventional techniques have failed to provide a sufficient design tool for concrete electronic devices or quantum computers of a three-dimensional structure composed of atoms.

The present invention has been developed in view of the above problem, and has an object of providing a numerical simulation apparatus capable of executing a numerical simulation with high speed and precision by reducing computational complexity.

Means to Solve the Problems

To achieve the stated object, the numerical simulation apparatus according to the present invention is (a) a numerical simulation apparatus that executes a numerical simulation using a wave function which is a solution of a time dependent Schrödinger equation, the numerical simulation apparatus including: (a1) a time evolution calculation unit that calculates a second wave function while evolving the second wave function from an initial time in increments of a predetermined time period, the second wave function being obtained by applying a central difference approximation in a real-space finite-difference method to a first wave function expressed using a propagator, and being expressed using a Bessel function; and (a2) a calculation result storage unit that stores a calculation result of the second wave function obtained at each time by the time evolution calculation unit while evolving the second wave function in increments of the predetermined time period.

According to this, numerical calculations of time evolution of a wave function according to the time dependent Schrödinger equation can be performed with high speed and precision.

Moreover, (b) the numerical simulation apparatus may further include: (b1) an initial wave function storage unit that stores a pulse function as the second wave function at the initial time; and (b2) a frequency analysis unit that calculates a steady-state solution of a scattering problem for predetermined energy, by performing a frequency analysis of the second wave function for the predetermined energy using the calculation result of the second wave function obtained by the time evolution calculation unit from the pulse function stored in the initial wave function storage unit.

According to this, a steady-state solution of a scattering problem can be obtained with high speed and precision by numerical calculations.

Moreover, (c) the time evolution calculation unit may calculate imaginary time evolution of the second wave function, using imaginary time that is obtained by multiplying time by an imaginary number.

According to this, numerical calculations of imaginary time evolution of a wave function used when determining a ground state and an excited state can be performed with high speed and precision.

Moreover, (d) the numerical simulation apparatus may further include an absorbing boundary condition storage unit that stores an absorption coefficient weighted so as to absorb an influence that is exerted on a model by the wave function in a boundary region of the model, the model being subject to the numerical simulation, wherein the time evolution calculation unit calculates the time evolution of the second wave function using the absorption coefficient stored in the absorbing boundary condition storage unit.

According to this, a large calculation region needed when setting an infinite boundary condition can be significantly reduced.

It should be noted that the present invention can be realized not only as the numerical simulation apparatus, but also as a numerical simulation method for controlling the numerical simulation apparatus, a numerical simulation program for causing one or more computer systems and the like to execute the numerical simulation method, a recording medium on which the numerical simulation program is recorded, and the like. The present invention can also be realized as a Large Scale Integration (LSI) including the functions of the numerical simulation apparatus, an Intellectual Property (IP) core for implementing these functions on a programmable logic device such as a Field Programmable Gate Array (FPGA) or a Complex Programmable Logic Device (CPLD), a recording medium on which the IP core is recorded, and the like.

Effects of the Invention

According to the present invention, by employing the wave function expressed using the Bessel function, numerical calculations of time evolution of a wave function according to the time dependent Schrödinger equation can be performed with high speed and precision. In addition, a steady-state solution of a scattering problem can be obtained with high speed and precision by numerical calculations. Further, numerical calculations of imaginary time evolution of a wave function used when determining a ground state and an excited state can be performed with high speed and precision. Moreover, a large calculation region needed when setting an infinite boundary condition can be significantly reduced.

Furthermore, by applying the present invention to the density functional theory which is a dominant method of electronic state calculations today, a numerical solution of the Kohn-Sham equation can be obtained with high speed. This makes it possible to numerically simulate dynamic behavior of electrons for an actual model. Thus, the present invention can be used for design of nanoscale electronic devices and quantum computers.

BRIEF DESCRIPTION OF DRAWINGS

In FIG. 1, (a) shows an overview of a nanoscale electronic device, and (b) shows an overview of a quantum wire.

FIG. 7 shows a result of analyzing a frequency of the wave function evolved with time and a result of calculating transmittance to the potential barrier.

NUMERICAL REFERENCES

Figure 2:
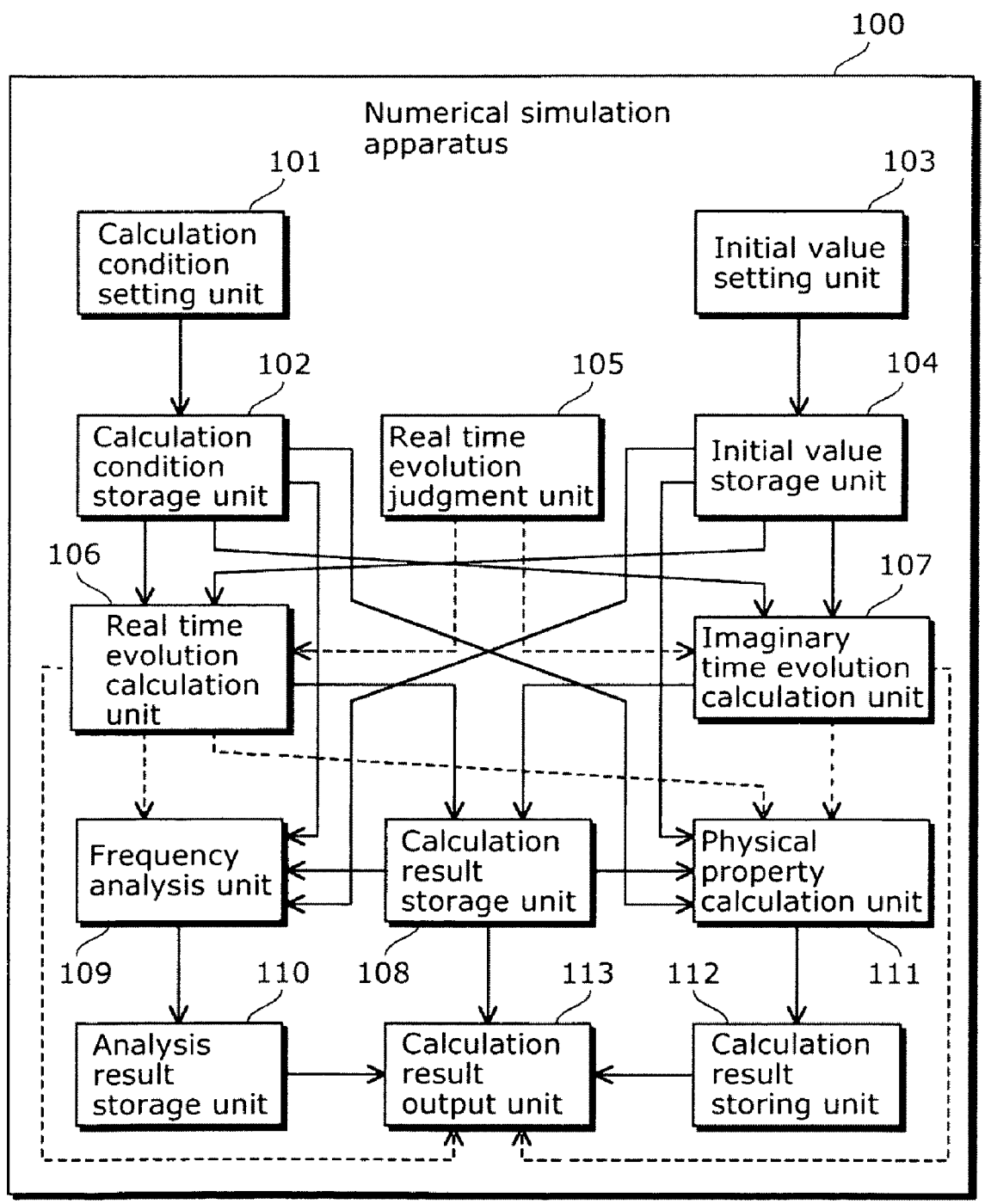
FIG. 2 shows a structure of a numerical simulation apparatus in an embodiment according to the present invention.

100 Numerical simulation apparatus
101 Calculation condition setting unit
102 Calculation condition storage unit
103 Initial value setting unit
104 Initial value storage unit
105 Real time evolution judgment unit
106 Real time evolution calculation unit
107 Imaginary time evolution calculation unit
108 Calculation result storage unit
109 Frequency analysis unit
110 Analysis result storage unit
111 Physical property calculation unit 112 Calculation result storing unit
113 Calculation result output unit

DETAILED DESCRIPTION OF THE INVENTION

Embodiment

An embodiment according to the present invention is described below, with reference to drawings.

A numerical simulation apparatus in this embodiment has the following features (a) to (d).

(a) A numerical simulation apparatus that executes a numerical simulation using a wave function which is a solution of a time dependent Schrödinger equation, includes: (a1) a time evolution calculation function that calculates a second wave function while evolving the second wave function from an initial time in increments of a predetermined time period, the second wave function being obtained by applying a central difference approximation in a real-space finite-difference method to a first wave function expressed using a propagator, and being expressed using a Bessel function; and (a2) a calculation result storage function that stores a calculation result of the second wave function obtained at each time by the time evolution calculation function while evolving the second wave function in increments of the predetermined time period.

(b) The numerical simulation apparatus includes: (b1) an initial wave function storage function that stores a pulse function as the second wave function at the initial time; and (b2) a frequency analysis function that calculates a steady-state solution of a scattering problem for predetermined energy, by performing a frequency analysis of the second wave function for the predetermined energy using the calculation result of the second wave function obtained by the time evolution calculation function from the pulse function stored in the initial wave function storage function.

(c) The time evolution calculation function calculates imaginary time evolution of the second wave function, using imaginary time that is obtained by multiplying time by an imaginary number.

(d) The numerical simulation apparatus includes an absorbing boundary condition storage function that stores an absorption coefficient weighted so as to absorb an influence that is exerted on a model by the wave function in a boundary region of the model, the model being subject to the numerical simulation, wherein the time evolution calculation function calculates the time evolution of the second wave function using the absorption coefficient stored in the absorbing boundary condition storage function.

On the basis of the above, the numerical simulation apparatus in this embodiment is described below.

FIG. 2 shows a structure of the numerical simulation apparatus in this embodiment. As shown in FIG. 2, a numerical simulation apparatus 100 includes a calculation condition setting unit 101, a calculation condition storage unit 102, an initial value setting unit 103, an initial value storage unit 104, a real time evolution judgment unit 105, a real time evolution calculation unit 106, an imaginary time evolution calculation unit 107, a calculation result storage unit 108, a frequency analysis unit 109, an analysis result storage unit 110, a physical property calculation unit 111, a calculation result storing unit 112, a calculation result output unit 113, and the like.

The calculation condition setting unit 101 receives calculation condition data from an operator (not illustrated) via an input device (not illustrated) or reads calculation condition data from a file (not illustrated) containing calculation condition data, when executing a numerical simulation. The calculation condition setting unit 101 outputs the calculation condition data received from the operator or the calculation condition data read from the file, to the calculation condition storage unit 102. Here, the calculation condition data may include a space size ($L_x$, $L_y$, $L_z$), a space step size ($h_x$, $h_y$, $h_z$), a time step size ($\Delta t$), a calculation time (T), and so on.

The calculation condition storage unit 102 stores the calculation condition data outputted from the calculation condition setting unit 101.

The initial value setting unit 103 receives an initial value from the operator (not illustrated) via the input device (not illustrated) or reads an initial value from a file (not illustrated) containing an initial value, when executing the numerical simulation. The initial value setting unit 103 outputs the initial value received from the operator or the initial value read from the file, to the initial value storage unit 104. Here, the initial value may include an initial wave function ($X(r_j, t_0)$), an initial potential ($V(r_j, t)$), an absorbing boundary condition, and so on.

The initial value storage unit 104 stores the initial value outputted from the initial value setting unit 103.

The real time evolution judgment unit 105 receives instruction data from the operator (not illustrated) via the input device (not illustrated) or reads instruction data from a file (not illustrated) containing instruction data, when executing the numerical simulation. The real time evolution judgment unit 105 judges whether or not to execute a real time evolution calculation process, from the instruction data received from the operator or the instruction data read from the file. When judging to execute the real time evolution calculation process, the real time evolution judgment unit 105 calls the real time evolution calculation unit 106 to execute the real time evolution calculation process. When judging not to execute the real time evolution calculation process, the real time evolution judgment unit 105 calls the imaginary time evolution calculation unit 107 to execute an imaginary time evolution calculation process.

The real time evolution calculation unit 106 executes the real time evolution calculation process, when called by the real time evolution judgment unit 105. Here, the real time evolution calculation unit 106 executes the real time evolution calculation process using the calculation condition stored in the calculation condition storage unit 102 and the initial value stored in the initial value storage unit 104. The real time evolution calculation unit 106 outputs an obtained calculation result to the calculation result storage unit 108.

The "real time evolution calculation process" is a process of calculating time evolution of a wave function, by calculating, through the use of the wave function at predetermined time t, the wave function at time $t+\Delta t$ which is evolved from predetermined time t by short time period $\Delta t$, and further repeating this wave function calculation through the use of the calculated wave function.

It should be noted that a second wave function (Expression (6) shown below) is employed as a wave function which is a solution of the time dependent Schrödinger equation. The second wave function is obtained by applying a central difference approximation in the real-space finite-difference method to a first wave function (Expression (5) shown above) expressed by a path integral using a propagator (Feynman Kernel), and is expressed using a Bessel function.

The second wave function may also be obtained by applying the central difference approximation in the real-space finite-difference method to a wave function expressed using a time evolution Green's function.

When the real time evolution calculation process ends, the real time evolution calculation unit 106 further calls the frequency analysis unit 109 and the physical property calculation unit 111 to execute a frequency analysis process and a physical property calculation process, respectively. When these processes end, the real time evolution calculation unit 106 calls the calculation result output unit 113, and ends the series of processes. The imaginary time evolution calculation unit 107 executes the imaginary time evolution calculation process, when called by the real time evolution judgment unit 105. Here, the imaginary time evolution calculation unit 107 executes the imaginary time evolution calculation process using the calculation condition stored in the calculation condition storage unit 102 and the initial value stored in the initial value storage unit 104. The imaginary time evolution calculation unit 107 outputs an obtained calculation result to the calculation result storage unit 108.

The "imaginary time evolution calculation process" is a process of calculating imaginary time evolution of the wave function by using imaginary time that is obtained by multiplying real time by an imaginary number.

When the imaginary time evolution calculation process ends, the imaginary time evolution calculation unit 107 further calls the physical property calculation unit 111 to execute the physical property calculation process. When the physical property calculation process ends, the imaginary time evolution calculation unit 107 calls the calculation result output unit 113, and ends the series of processes.

The calculation result storage unit 108 stores the calculation result outputted from the real time evolution calculation unit 106. Likewise, the calculation result storage unit 108 stores the calculation result outputted from the imaginary time evolution calculation unit 107.

The frequency analysis unit 109 executes the frequency analysis process, when called by the real time evolution calculation unit 106. Here, the frequency analysis unit 109 executes the frequency analysis process using the calculation condition data stored in the calculation condition storage unit 102, the initial value stored in the initial value storage unit 104, and the calculation result stored in the calculation result storage unit 108. The frequency analysis unit 109 outputs an obtained analysis result to the analysis result storage unit 110.

The "frequency analysis process" is a process of calculating a steady-state solution of a scattering problem for predetermined energy, by performing a frequency analysis of the wave function for the predetermined energy using the calculation result obtained as a result of the real time evolution calculation process from a pulse function that is stored as the wave function at the initial time.

The analysis result storage unit 110 stores the analysis result outputted from the frequency analysis unit 109.

The physical property calculation unit 111 executes the physical property calculation process, when called by the real time evolution calculation unit 106. Here, the physical property calculation unit 111 executes the physical property calculation process using the calculation condition data stored in the calculation condition storage unit 102, the initial value stored in the initial value storage unit 104, and the calculation result stored in the calculation result storage unit 108. The physical property calculation unit 111 outputs an obtained calculation result to the calculation result storing unit 112.

The physical property calculation unit 111 also executes the physical property calculation process, when called by the imaginary time evolution calculation unit 107. Here, the physical property calculation unit 111 executes the physical property calculation process using the calculation condition data stored in the calculation condition storage unit 102, the initial value stored in the initial value storage unit 104, and the calculation result stored in the calculation result storage unit 108. The physical property calculation unit 111 outputs an obtained calculation result to the calculation result storing unit 112.

The "physical property calculation process" is a process, of calculating a physical property such as conductance on the basis of an eigenfunction and an eigenvalue obtained as a result of numerical calculations. Note that the following physical properties (1) to (8) may also be calculated using the eigenfunction, the eigenvalue, and the like obtained as a result of calculations.

(1) A charge density spatial distribution may be calculated.

(2) Energy dependence of an electronic density of states may be calculated.

(3) A force acting on an atom may be calculated as an example. The calculated force acting on the atom may be utilized to execute a molecular dynamics simulation for tracking atomic motion and execute a process of searching for an optimum atomic structure or tracking a chemical reaction.

(4) An adiabatic potential curve may be calculated from total energy of a system, with an elastic modulus being calculated from the calculated adiabatic potential curve.

(5) An atomic vibrational spectrum may be calculated. Further, an infrared absorption spectrum may be calculated using the calculated atomic vibrational spectrum.

(6) An optical physical property such as reflectivity and permittivity may be calculated.

(7) Excitation energy may be calculated.

(8) A magnetic physical property may be calculated from an electronic spin state.

The calculation result storing unit 112 stores the calculation result outputted from the physical property calculation unit 111.

The calculation result output unit 113 outputs the calculation result stored in the calculation result storage unit 108, the analysis result stored in the analysis result storage unit 110, and the calculation result stored in the calculation result storing unit 112, when called by the real time evolution calculation unit 106. Here, the calculation result output unit 113 outputs these results to the operator via an output device (not illustrated), or outputs these results to a file.

The calculation result output unit 113 also outputs the calculation result stored in the calculation result storage unit 108 and the calculation result stored in the calculation result storing unit 112, when called by the imaginary time evolution calculation unit 107. Here, the calculation result output unit 113 outputs these results to the operator via the output device (not illustrated), or outputs these results to a file.

A numerical simulation process executed in the numerical simulation apparatus 100 in this embodiment is described below.

Figure 3:
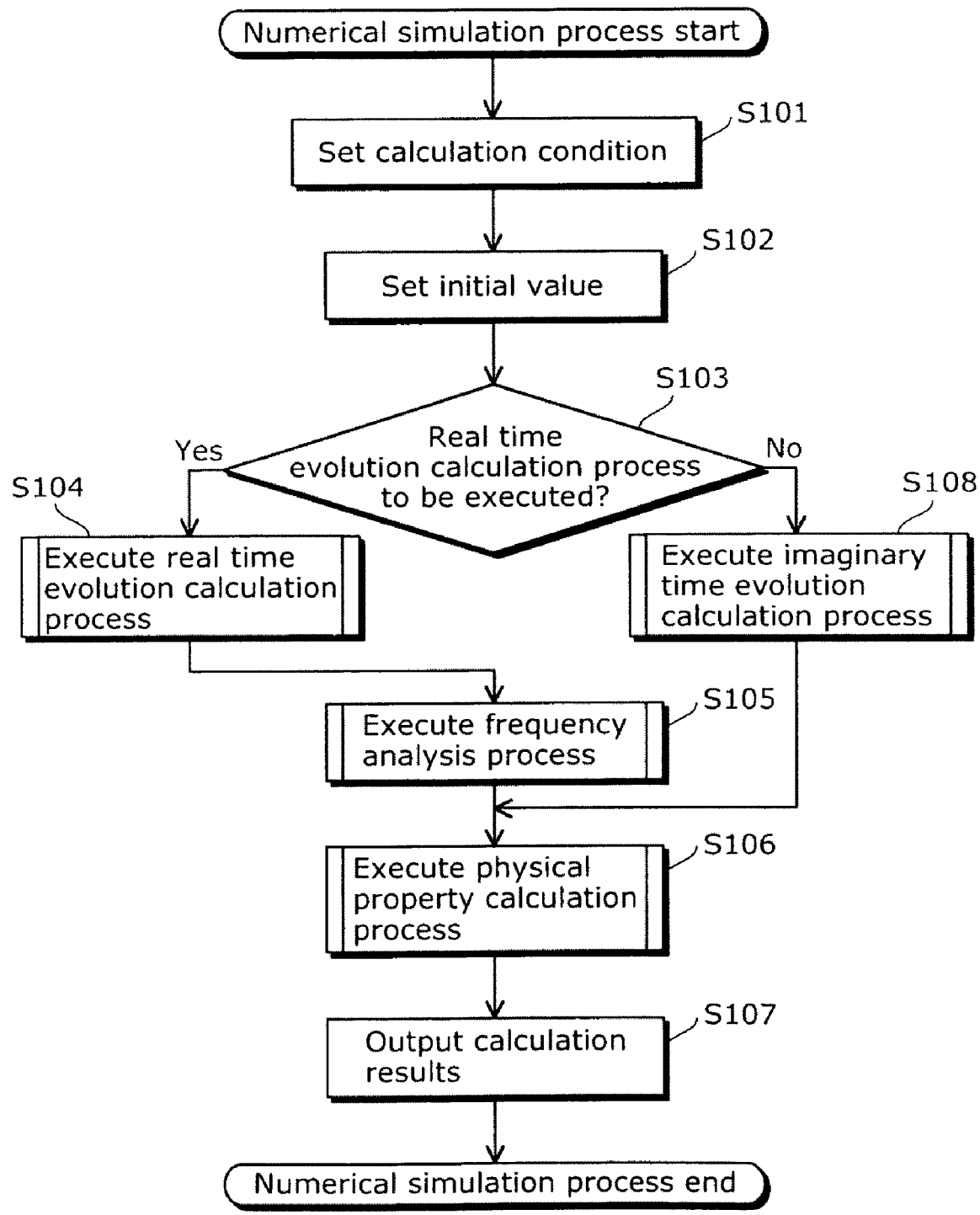
FIG. 3 shows a numerical simulation process executed in the numerical simulation apparatus in the embodiment according to the present invention.

FIG. 3 shows the numerical simulation process executed in the numerical simulation apparatus 100 in this embodiment. As shown in FIG. 3, the numerical simulation apparatus 100 sets the calculation condition (Step S101). In detail, the calculation condition setting unit 101 receives the calculation condition data from the operator via the input device, or reads the calculation condition data from the file containing the calculation condition data. The calculation condition setting unit 101 outputs the calculation condition data received from the operator or the calculation condition data read from the file, to the calculation condition storage unit 102. The calculation condition storage unit 102 stores the calculation condition data outputted from the calculation condition setting unit 101.

Next, the numerical simulation apparatus 100 sets the initial value (Step S102). In detail, the initial value setting unit 103 receives the initial value from the operator via the input device, or reads the initial value from the file containing the initial value. The initial value setting unit 103 outputs the initial value received from the operator or the initial value read from the file, to the initial value storage unit 104. The initial value storage unit 104 stores the initial value outputted from the initial value setting unit 103.

Next, the numerical simulation apparatus 100 judges whether or not to execute the real time evolution calculation process (Step S103). In detail, the real time evolution judgment unit 105 receives the instruction data from the operator via the input device, or reads the instruction data from the file containing the instruction data. The real time evolution judgment unit 105 judges whether or not to execute the real time evolution calculation process, on the basis of the instruction data received from the operator or the instruction data read from the file.

Next, when judging to execute the real time evolution calculation process (Step S103: Yes), the numerical simulation apparatus 100 executes the real time evolution calculation process (Step S104). In detail, the real time evolution judgment unit 105 calls the real time evolution calculation unit 106 to execute the real time evolution calculation process.

After the real time evolution calculation process ends, the numerical simulation apparatus 100 further executes the frequency analysis process (Step S105). The numerical simulation apparatus 100 also executes the physical property calculation process (Step S106). In detail, the real time evolution calculation unit 106 calls the frequency analysis unit 109 to execute the frequency analysis process. The real time evolution calculation unit 106 also calls the physical property calculation unit 111 to execute the physical property calculation process.

The numerical simulation apparatus 100 then outputs the calculation results (Step S107). In detail, after the real time evolution calculation process, the frequency analysis process, and the physical property calculation process end, the real time evolution calculation unit 106 calls the calculation result output unit 113 to output the calculation result, the analysis result, and the calculation result obtained as a result of the series of processes.

When judging not to execute the real time evolution calculation process (Step S103: No), on the other hand, the numerical simulation apparatus 100 executes the imaginary time evolution calculation process (Step S108). In detail, the real time evolution judgment unit 105 calls the imaginary time evolution calculation unit 107 to execute the imaginary time evolution calculation process.

After the imaginary time evolution calculation process ends, the numerical simulation apparatus 100 further executes the physical property calculation process (Step S106). In detail, the imaginary time evolution calculation unit 107 calls the physical property calculation unit 111 to execute the physical property calculation process.

The numerical simulation apparatus 100 then outputs the calculation results (Step S107). In detail, after the imaginary time evolution calculation process and the physical property calculation process end, the imaginary time evolution calculation unit 107 calls the calculation result output unit 113 to output the calculation result and the calculation result obtained as a result of the series of processes.

Features of the numerical simulation apparatus 100 in this embodiment are described next. The numerical simulation apparatus 100 has the following features (1) to (4).

(1) Numerical calculations of time evolution of a wave function according to the time dependent Schrödinger equation can be executed with high speed and precision.

(2) Numerical calculations of a steady-state solution of a scattering problem can be executed with high speed and precision.

(3) Numerical calculations of imaginary time evolution of a wave function used when determining a ground state and an excited state can be performed with high speed and precision.

(4) A large calculation region needed when setting an infinite boundary condition can be significantly reduced.

First, the capability of the numerical simulation apparatus 100 in this embodiment to perform numerical calculations of time evolution of a wave function according to the time dependent Schrödinger equation with high speed and precision is described below.

When performing integration of the above Expression (5), a central difference approximation in the real-space finite-difference method is applied. As a result, as shown in the following Expression (6), the wave function after short time period $\Delta t$ can be approximated using the Bessel function shown in the following Expression (7). This contributes to reductions in computational complexity of the real time evolution calculation process and the imaginary time evolution calculation process, with it being possible to execute a numerical simulation with high speed and precision.

[Expression 6]

$$\Psi(r_j, t + \Delta t) = \sum_{j'_x} \sum_{j'_y} \sum_{j'_z} \left[ \prod_{l=x,y,z} i^{j_l - j'_l} e^{-i\frac{\Delta t}{h_l^2}} J_{j_l - j'_l}\left(\frac{\Delta t}{h_l^2}\right) \right] \times e^{-i\Delta t V(r_j, t)} \Psi(r'_j, t) \quad (6)$$

[Expression 7]

$$J_n(x) = \sum_{s=0}^{\infty} \frac{(-1)^s (x/2)^{n+2s}}{s!(n+s)!} \quad (7)$$

$r_j$ is given by the following Expression (8), and $r_{j'}$ is given by the following Expression (9). ln is a space step size in the $l$ (=x, y, z) direction, and $j_l$ and $j_{l'}$ are integers.

[Expression 8]

$$r_j = (h_x j_x, h_y j_y, h_z j_z) \quad (8)$$

[Expression 9]

$$r_{j'} = (h_x j'_x, h_y j'_y, h_z j'_z) \quad (9)$$

Figure 4:
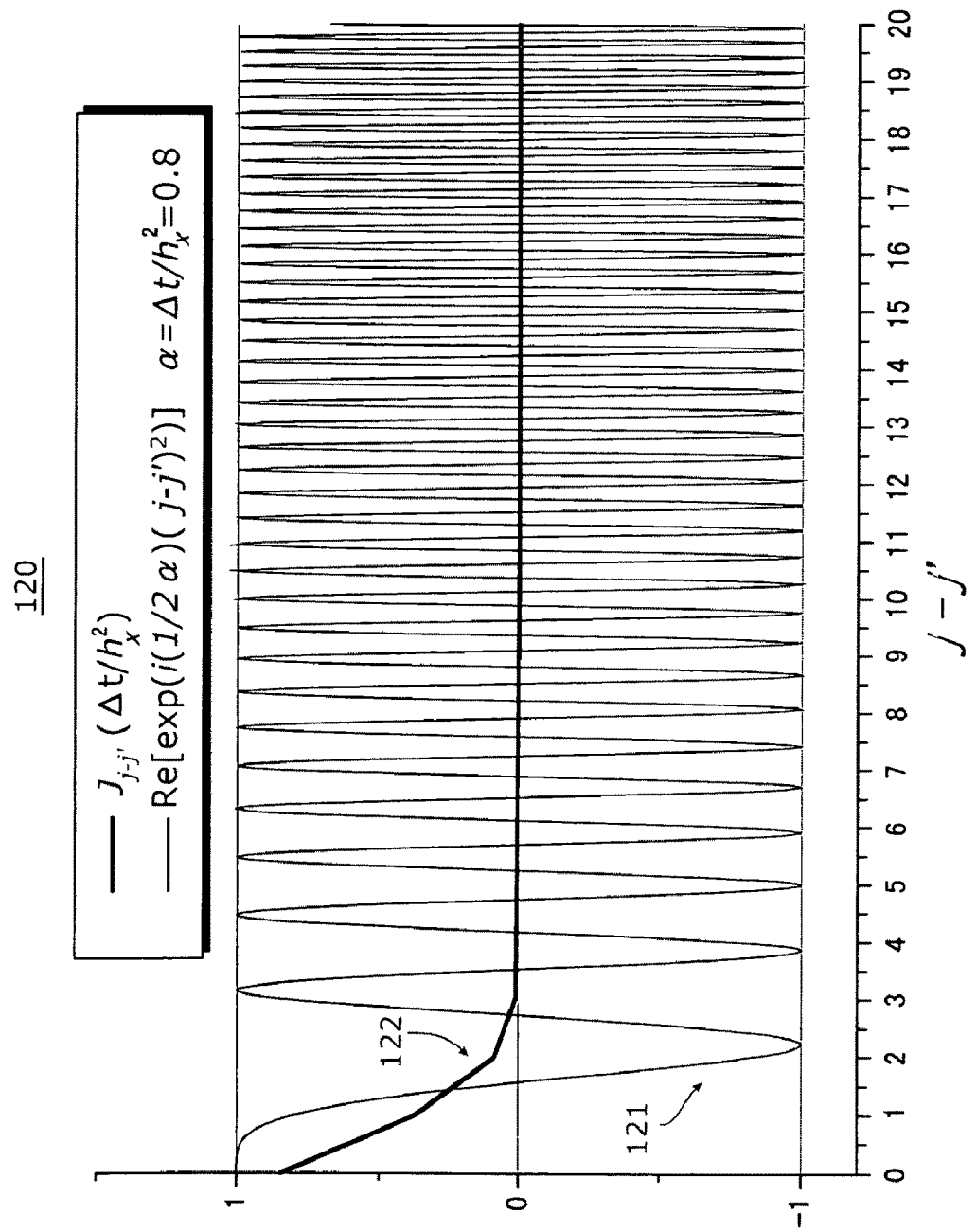
FIG. 4 shows a value of a Bessel function and a real part of an integrand.

FIG. 4 shows a value of the Bessel function $J_{j-j'}(\Delta t/h_x^2)$ and a real part of an integrand $\exp(i(x_j - x_{j'})^2/2\Delta t)$ of the above Expression (5), where $x_j = jh_x$, $x_{j'} = j'h_x$, $\Delta t = 0.2$, and $h_x = 0.5$.

As shown in FIG. 4, the Bessel function $J_{j-j'}(x)$ rapidly decays with increasing $|j-j'|$ (graph 122). Accordingly, summation can be stopped at such a small term that does not influence a calculation result. This being so, by approximating the above Expression (5) using the above Expression (6), a sum relating to j' of the above Expression (6) is calculated, and therefore computational complexity can be significantly reduced when compared with the case of calculating a direct integral. As a result, the numerical simulation can be executed with high speed.

This is because calculating the direct integral of the above Expression (5) requires integration to be performed over an extremely wide range. Take an x' component of the integrand of the above Expression (5) given by the following Expression (10), as one example. In this case, the integrand for integration of x' given by the following Expression (11) is a vibrational function (trigonometric function) for x'. This does not decay with increasing x', as shown in FIG. 4 (graph 121). Hence, it is necessary to perform integration over an extremely wide range.

[Expression 10]

$$\exp[i(r-r')^2/2\Delta t] \quad (10)$$

[Expression 11]

$$\exp[i(x-x')^2/2\Delta t] \quad (11)$$

Note that an explanation on how the correct result can be obtained using the above Expression (6) will be given later.

Next, the capability of the numerical simulation apparatus 100 in this embodiment to numerically simulate numerical calculations of a steady-state solution of a scattering problem with high speed and precision is described below. A system in which potential V does not depend on time is used as an example. In this case, the frequency analysis unit 109 can find a steady-state solution of a scattering problem using the above Expression (6). Here, a pulse function on plane $z=z_0$ is used as an initial wave function at initial time to, as shown in the following Expression (12).

[Expression 12]

$$\chi(r_j, t_0) = \begin{cases} \dfrac{1}{\sqrt{N_x N_y}} \exp[i(G_{nx} h_x j_x + G_{ny} h_y j_y)] & (j_z = 0) \\ 0 & (j_z \ne 0) \end{cases} \quad (12)$$

$G_{nx}$ and $G_{ny}$ are reciprocal lattice vectors, and are respectively given by the following Expressions (13) and (14). $N_x$ is the number of lattice points in the x direction, and $n_x$ is an integer. $N_y$ is the number of lattice points in the y direction, and $n_y$ is an integer.

[Expression 13]

$$G_{nx} = \frac{2\pi}{N_x h_x} n_x \quad (13)$$

[Expression 14]

$$G_{ny} = \frac{2\pi}{N_y h_y} n_y \quad (14)$$

The frequency analysis unit 109 can calculate wave function $X(r_j, t)$ which is evolved into an arbitrary time from initial time $t_0$, by using the initial wave function indicated by the above Expression (12) and the above Expression (5). Further, the frequency analysis unit 109 can perform a frequency analysis of wave function $X(r_j, t)$ for energy E, as shown in the following Expression (15).

[Expression 15]

$$\Psi(r_j; E) = C(E) \int_{t_0}^{\infty} e^{iE(t-t_0)} \chi(r_j, t) dt \quad (15)$$

C(E) is given by the following Expression (16). $v_z(E)$ is a group velocity in the z direction, and is given by the following Expression (17). $k_z$ is a wave number in the z direction, and is given by the following Expression (18).

[Expression 16]

$$C(E) = \frac{1}{h_z} v_z(E) e^{ik_z z_0} \quad (16)$$

[Expression 17]

$$v_z(E) = \frac{1}{h_z} \sin k_z h_z \quad (17)$$

[Expression 18]

$$k_z = \frac{1}{h_z} \cos^{-1}(1 - h_z^2 E) \quad (18)$$

The above Expression (15) is used to numerically simulate the wave function evolved with time, with the pulse function indicated by the above Expression (12) being set as the initial wave function. In this way, steady-state wave function $\Psi(r_j; E)$ in total energy E can be numerically simulated.

Next, the capability of the numerical simulation apparatus 100 in this embodiment to numerically simulate numerical calculations of imaginary time evolution of a wave function used when determining a ground state and an excited state with high speed and precision is described below. A system in which potential V does not depend on time is used as an example. In this case, the imaginary time evolution calculation unit 107 can extend to a calculation method of finding a "steady-state solution not dependent on time" in a discrete eigenvalue problem with high speed, by using the above Expression (6) and imaginary time evolution calculations. A propagator is defined by the following Expression (19), with eigenfunction $\Phi_i(r)$ and eigenvalue $E_i$ of the system.

[Expression 19]

$$K(r, t; r', t_0) = \sum_i \phi_i(r) \phi_i^*(r') e^{-iE_i(t-t_0)} \quad (19)$$

Integrating for r where r'=r yields the following Expression (20), due to orthonormality of the eigenfunction.

[Expression 20]

$$\int_{-\infty}^{\infty} K(r, t; r, t_0) d^3 r = \int_{-\infty}^{\infty} \sum_i \phi_i(r) \phi_i^*(r') e^{-iE_i(t-t_0)} d^3 r \quad (20)$$

$$= \sum_i e^{-iE_i(t-t_0)}$$

Furthermore, by formally introducing imaginary time T=it and evolving over a sufficiently long imaginary time, that is, T→∞, an approximation can be made as indicated by the following Expression (21). This is because the term of lowest energy $E_0$ decays most slowly.

[Expression 21]

$$\lim_{\tau \to \infty} \int_{-\infty}^{\infty} K(r, -i\tau; r, -i\tau_0) d^3 r \approx e^{-E_0(\tau - \tau_0)} \quad (21)$$

This demonstrates that a discrete eigenstate can be obtained by imaginary time evolution calculations, which is a well-known calculation method (for example, see Non-patent Reference 2).

Accordingly, substituting imaginary time for the time in the above Expression (6) gives the following Expression (22).

[Expression 22]

$$\Psi(r_j, -i(\tau + \Delta\tau)) = \qquad (22)$$

$$\sum_{j'_x} \sum_{j'_y} \sum_{j'_z} \left[ \prod_{l=x,y,z} i^{j_l - j'_l} e^{-\frac{\Delta\tau}{h_l^2}} J_{j_l - j'_l}\left(-i\frac{\Delta\tau}{h_l^2}\right) \right] \times e^{-i\Delta\tau V(r_j, -i\tau)}$$

$$\Psi(r'_j; -i\tau)$$

The imaginary time evolution can be calculated with high speed by using the above Expression (22), and also the excited state can be calculated by using the initial wave function orthogonal to the ground state wave function.

Next, the capability of the numerical simulation apparatus 100 in this embodiment to significantly reduce a large calculation region needed when setting an infinite boundary condition is described below.

For example, to obtain a correct result in a scattering problem, a sufficiently large space (calculation region) equal to or more than about 100 times a spatial size of a scattering potential needs to be set as a calculation condition. This being the case, by applying such an "absorbing boundary condition" that smoothly decays the wave function to an absorbing region, the size of the calculation region can be reduced.

Figure 5:
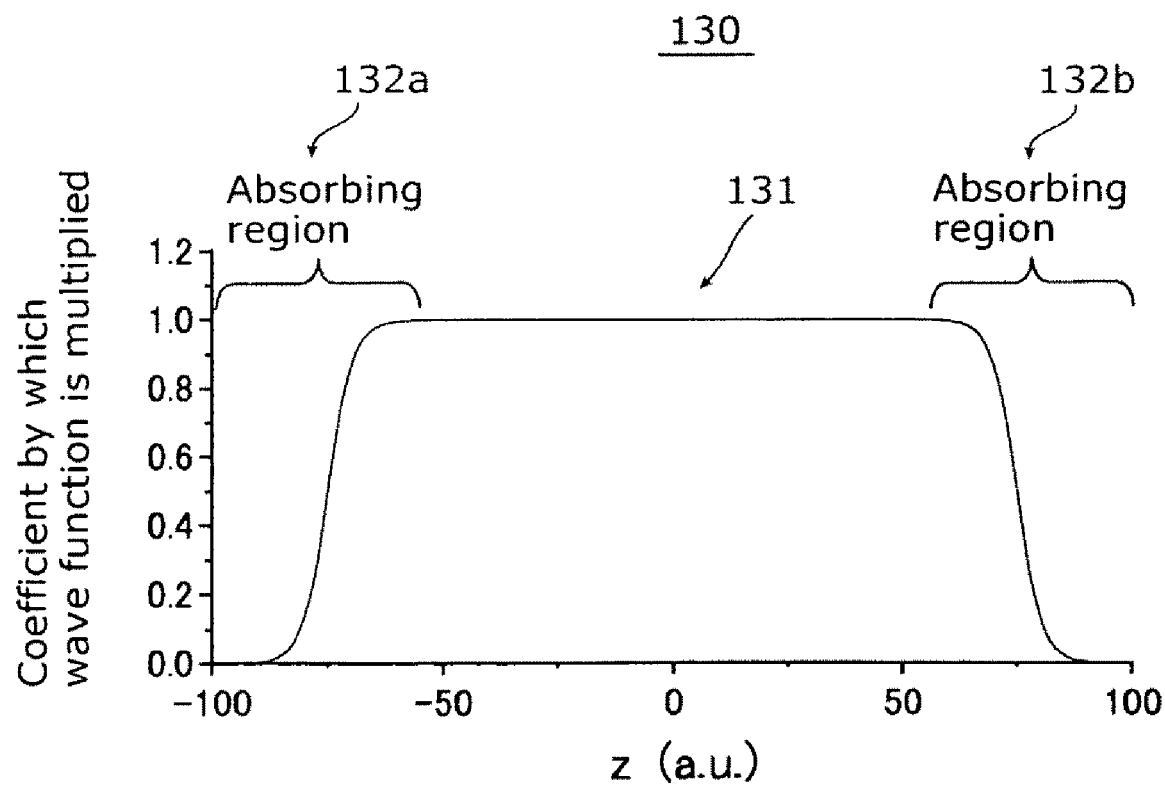
FIG. 5 shows a setting example of a coefficient by which a wave function is multiplied in an absorbing boundary condition.

FIG. 5 shows a setting example of a coefficient by which the wave function is multiplied in the absorbing boundary condition. As shown in FIG. 5, by applying such an "absorbing boundary condition" that smoothly decays the wave function by, for example, multiplying the wave function by the coefficient in absorbing regions 132a and 132b, the size of the calculation region can be reduced to about several times to 10 times the size of the scatterer. This contributes to reductions in computational complexity of the real time evolution calculation process and the imaginary time evolution calculation process, with it being possible to execute a numerical simulation with high speed and precision.

Results of executing numerical simulations on simple models using the numerical simulation apparatus in this embodiment are described below.

Figure 6:
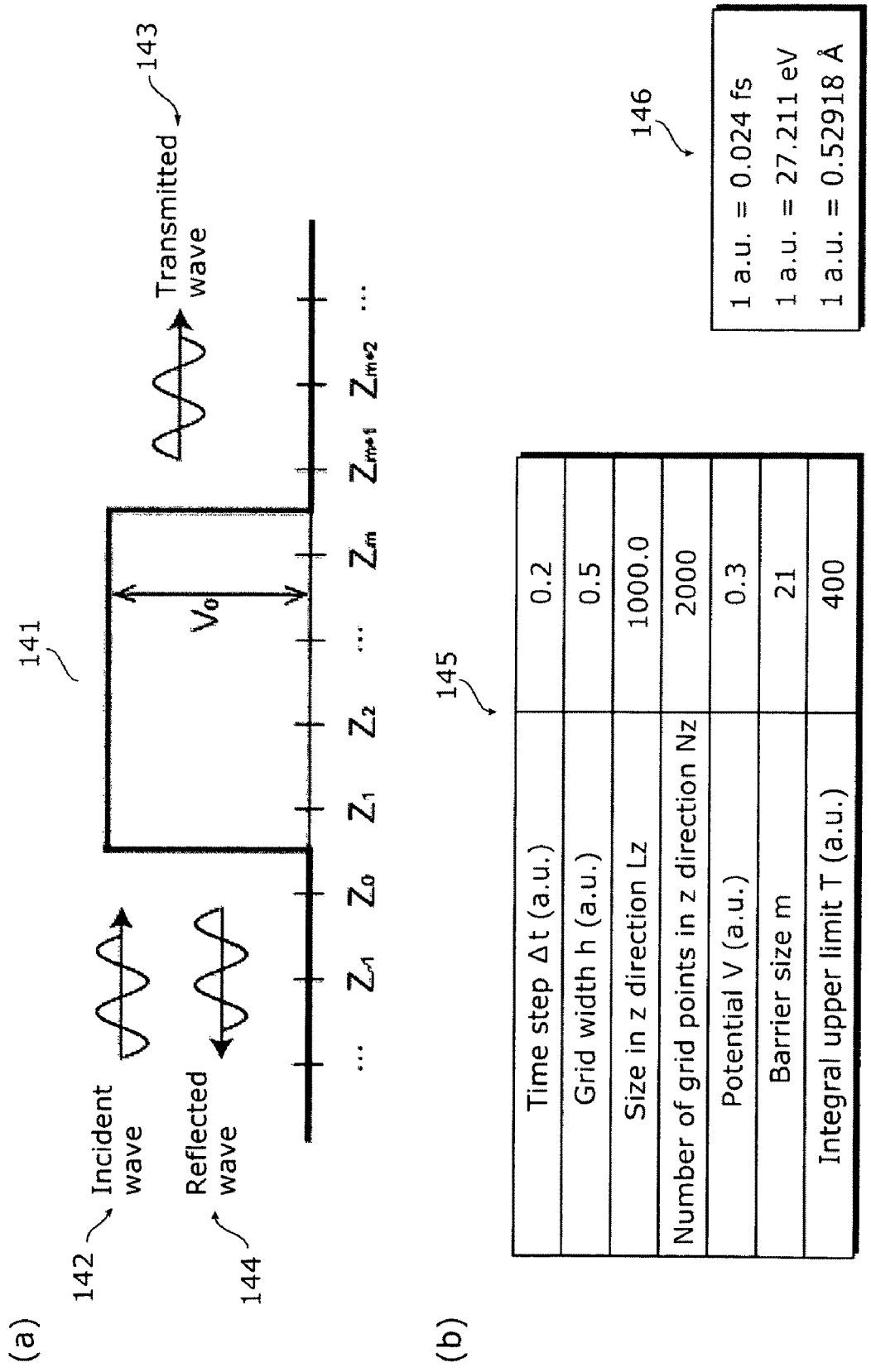
FIG. 6 shows a one-dimensional scattering problem by a potential barrier.

FIG. 6 shows a one-dimensional scattering problem by a potential barrier. As shown in FIG. 6, suppose an incident wave 142 enters a potential barrier 141 from the left, where time step Δt=0.2 (a.u.), grid width h=0.5 (a.u.), size in z direction Lz=1000.0, number of grid points in z direction Nz=2000, potential V=0.3 (a.u.), barrier size m=21, and integral upper limit T=400 (a.u.) (table 145). Moreover, 1 (a.u.)= 0.024 (fs)=27.211 (eV)=0.52918 Å (text box 146).

FIG. 7 shows a result of analyzing a frequency of the wave function evolved with time and a result of calculating transmittance to the potential barrier. As shown in FIG. 7, as a result of analyzing the frequency of the time-evolved wave function by energy (graphs 148a, 148b, and 148c), the transmittance matches the exact solution (graph 147).

Figure 8:
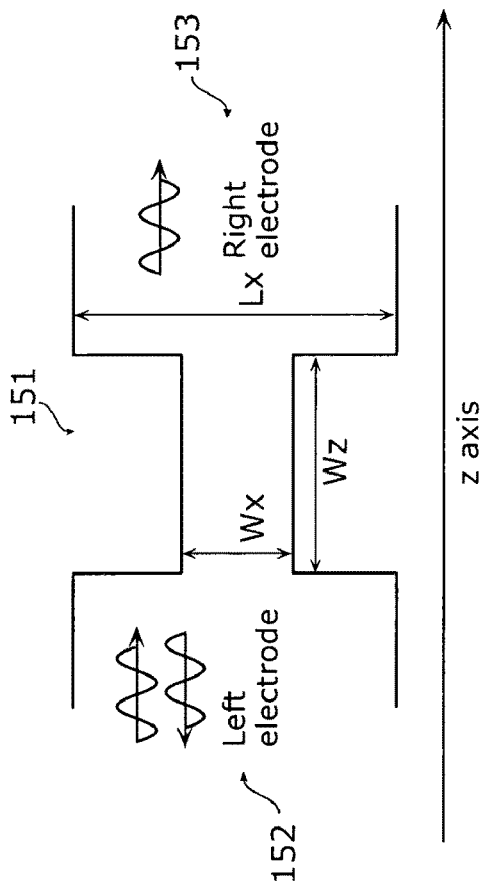
FIG. 8 shows a two-dimensional wire model.

FIG. 8 shows a two-dimensional wire model. As shown in FIG. 8, suppose an incident wave enters a wire 151 of width Wx and length Wz connecting a left electrode 152 and a right electrode 153, from the left electrode 152, where time step Δt=0.2 (a.u.), grid width h=0.5 (a.u.), size in x direction Lx=4.0, number of grid points in x direction Nx=8, size in z direction Lz=500.0, number of grid points in z direction Nz=1000, integral upper limit T=200 (a.u.), and incident electron energy is 0.05 to 1.10 (table 155). Moreover, 1 (a.u.)= 0.024 (fs)=27.211 (eV)=0.52918 Å (text box 156).

Figure 9:
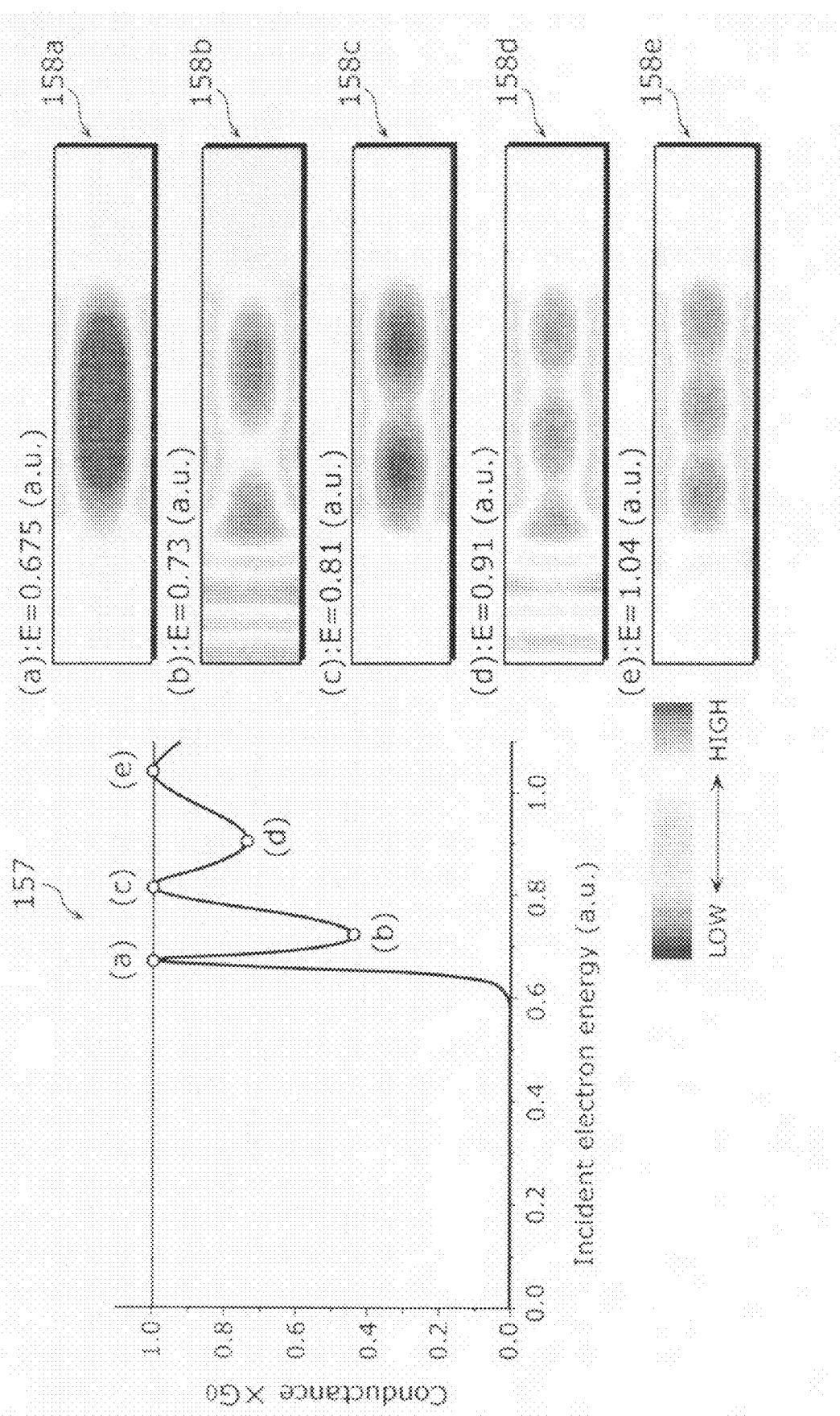
FIG. 9 shows a result of analyzing a frequency in the two-dimensional wire model and a result of calculating conductance.

FIG. 9 shows a result of analyzing a frequency in the two-dimensional wire model and a result of calculating conductance. As shown in FIG. 9, by analyzing the frequency of the time-evolved wave function by energy (graphs 158a to 158e), the result matching that of the OBM method is obtained (graph 157).

Figure 10:
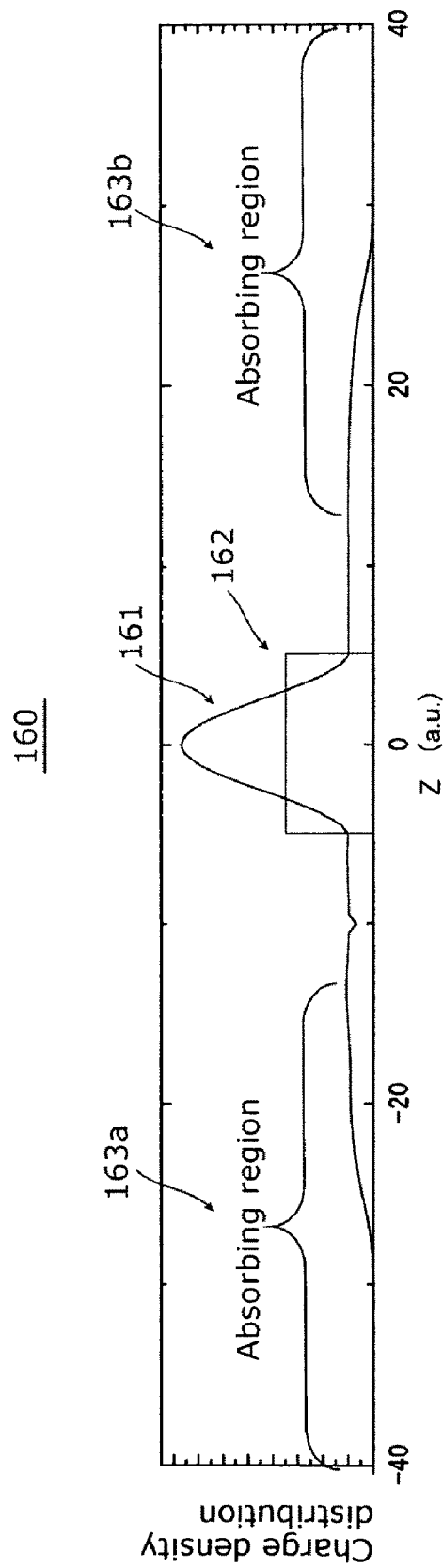
FIG. 10 shows a scattering wave function obtained by applying an absorbing boundary condition.

FIG. 10 shows a scattering wave function obtained by applying the absorbing boundary condition. As shown in FIG. 10, computational complexity can be significantly reduced while maintaining computational precision.

Figure 11:
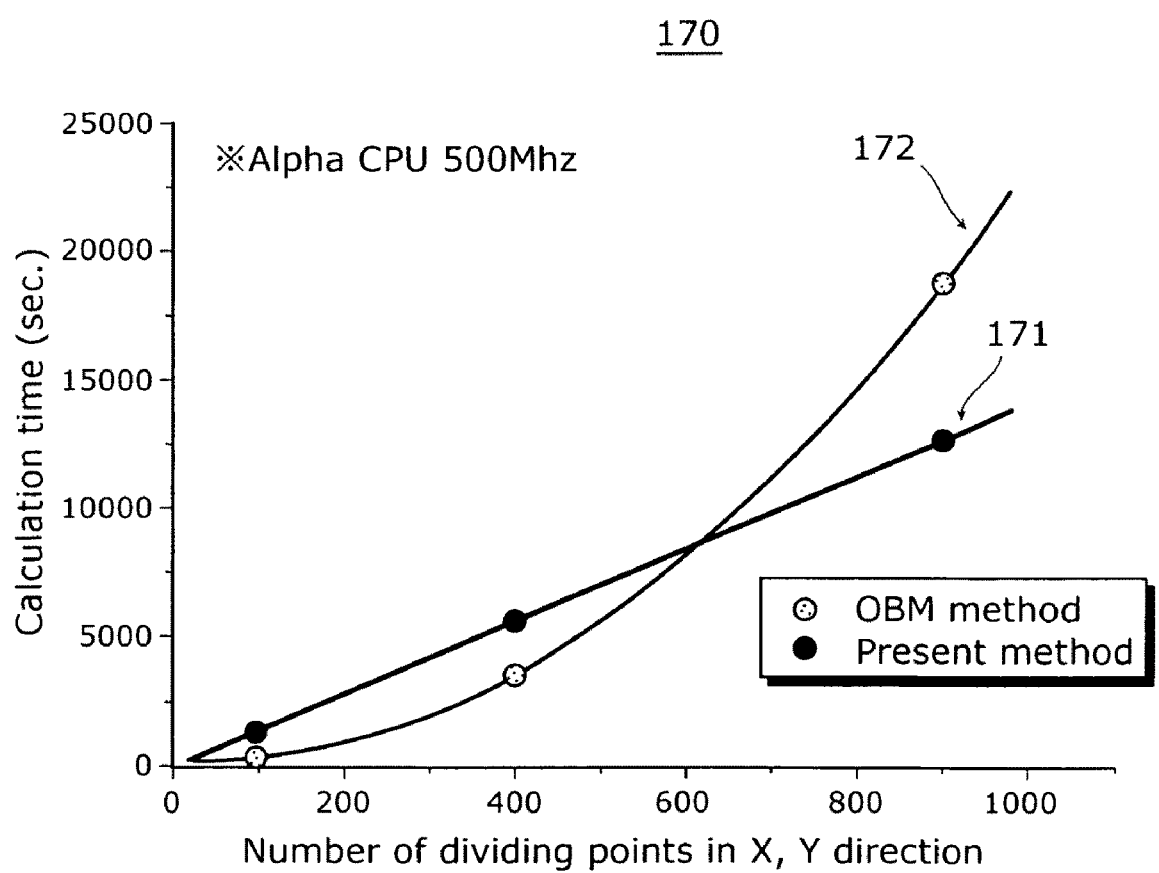
FIG. 11 shows calculation cost evaluations.

FIG. 11 shows calculation cost evaluations. As shown in FIG. 11, given that a scattering solution at arbitrary energy can be calculated according to the present method (graph 171), the present method can realize a faster numerical simulation than the OBM is method (graph 172). Which is to say, the present method can numerically simulate high-speed electrical conduction properties.

As described above, according to the numerical simulation apparatus 100 in this embodiment, by employing the wave function expressed using the Bessel function, numerical calculations of time evolution of a wave function according to the time dependent Schrödinger equation can be performed with high speed and precision. In addition, a steady-state solution of a scattering problem can be obtained with high speed and precision by numerical calculations. Further, numerical calculations of imaginary time evolution of a wave function used when determining a ground state and an excited state can be performed with high speed and precision. Moreover, a large calculation region needed when setting an infinite boundary condition can be significantly reduced.

Furthermore, by applying to the density functional theory which is a dominant method of electronic state calculations today, a numerical solution of the Kohn-Sham equation can be obtained with high speed. This makes it possible to numerically simulate dynamic behavior of electrons for an actual model. Thus, the numerical simulation apparatus 100 can be used for design of nanoscale electronic devices and quantum computers.

A supplementary explanation on the above Expression (6) is given below.

In the path integral representation, the time evolution of the wave function after short time period Δt is expressed by the following Expression (23) (for example, see Non-patent Reference 2).

[Expression 23]

$$\Psi(r, t + \Delta t) = \sqrt{\frac{1}{2\pi i \Delta t}} \int_{-\infty}^{\infty} e^{i\frac{(r-r')^2}{2\Delta t}} e^{-i\Delta t V\left(\frac{r+r'}{2}, t + \frac{\Delta t}{2}\right)} \Psi(r', t) d^3 r' \qquad (23)$$

It is assumed here that potential V depends on time in general. When x, y, and z are used as coordinate variables, the above Expression (23) is written as the following Expression (24).

[Expression 24]

$$\Psi(x, y, z, t + \Delta t) = \sqrt{\frac{1}{2\pi i \Delta t}} \quad (24)$$

$$\int_{-\infty}^{\infty}\int_{-\infty}^{\infty}\int_{-\infty}^{\infty} e^{i\frac{(x-x')^2}{2\Delta t}} e^{i\frac{(y-y')^2}{2\Delta t}} e^{i\frac{(z-z')^2}{2\Delta t}} \times e^{-i\Delta t V\left(\frac{x+x'}{2}, \frac{y+y'}{2}, \frac{z+z'}{2}, t+\frac{\Delta t}{2}\right)}$$

$$\Psi(x', y', z', t) dx' dy' dz'$$

The following describes only the x coordinate, as this is no loss of generality. That is, the above Expression (24) is simplified to the following Expression (25).

[Expression 25]

$$\Psi(x, t + \Delta t) = \sqrt{\frac{1}{2\pi i \Delta t}} \int_{-\infty}^{\infty} e^{i\frac{(x-x')^2}{2\Delta t}} e^{-i\Delta t V\left(\frac{x+x'}{2}, t+\frac{\Delta t}{2}\right)} \Psi(x', t) dx' \quad (25)$$

Since contributions to an integral about x' come only from a neighborhood of x (for example, see Non-patent Reference 2), an integration variable is transformed from x' to η such that x'=x+η. As a result, the above Expression (25) is written as the following Expression (26).

[Expression 26]

$$\Psi(x, t + \Delta t) = \sqrt{\frac{1}{2\pi i \Delta t}} \int_{-\infty}^{\infty} e^{i\frac{\eta^2}{2\Delta t}} e^{-i\Delta t V\left(x+\frac{\eta}{2}, t+\frac{\Delta t}{2}\right)} \Psi(x+\eta, t) d\eta \quad (26)$$

Moreover, since main contributions to an integral of η occur only where η is small (for example, see Non-patent Reference 2), wave function $\Psi(x+\eta, t)$ is subject to Taylor expansion around x. In addition, potential $V(x+\eta/2, t+\Delta t/2)$ is subject to Taylor expansion around t and x. This allows the above Expression (26) to be approximated by the following Expression (27).

[Expression 27]

$$\Psi(x, t + \Delta t) \approx \quad (27)$$

$$\sqrt{\frac{1}{2\pi i \Delta t}} \int_{-\infty}^{\infty} e^{i\frac{\eta^2}{2\Delta t}} \left[\Psi(x, t) + \eta \frac{\partial}{\partial x}\Psi(x, t) + \frac{1}{2}\eta^2 \frac{\partial^2}{\partial x^2}\Psi(x, t)\right] \times$$

$$e^{-i\Delta t V\left(x+\frac{\eta}{2}, t\right)} d\eta \approx$$

$$\sqrt{\frac{1}{2\pi i \Delta t}} \int_{-\infty}^{\infty} e^{i\frac{\eta^2}{2\Delta t}} \left[\Psi(x, t) + \eta \frac{\partial}{\partial x}\Psi(x, t) + \frac{1}{2}\eta^2 \frac{\partial^2}{\partial x^2}\Psi(x, t) + \right] \times$$

$$e^{-i\Delta t \left[V(x,t) + \frac{\eta}{2}\frac{\partial}{\partial x}V(x,t) + \frac{1}{2}\left(\frac{\eta}{2}\right)^2 \frac{\partial^2}{\partial x^2}V(x,t)\right]} d\eta$$

Furthermore, a term containing a space derivative of potential V is expanded using the following Expression (28). This allows the above Expression (27) to be approximated by the following Expression (29).

[Expression 28]

$$e^z \approx 1 + z \quad (28)$$

[Expression 29]

$$\Psi(x, t + \Delta t) \approx \quad (29)$$

$$\sqrt{\frac{1}{2\pi i \Delta t}} \int_{-\infty}^{\infty} e^{i\frac{\eta^2}{2\Delta t}} \left[\Psi(x, t) + \eta \frac{\partial}{\partial x}\Psi(x, t) + \frac{1}{2}\eta^2 \frac{\partial^2}{\partial x^2}\Psi(x, t)\right] \times$$

$$e^{-i\Delta t V(x,t)} \left[1 - i\Delta t \left(\frac{\eta}{2}\frac{\partial}{\partial x}V(x,t) + \frac{1}{2}\left(\frac{\eta}{2}\right)^2 \frac{\partial^2}{\partial x^2}V(x,t)\right)\right] d\eta$$

Here, components of a product of an even function given by the following Expression (30) and an odd function given by the following Expression (31) are 0, as shown in the following Expression (32).

[Expression 30]

$$e^{i\frac{\eta^2}{2\Delta t}} \quad (30)$$

[Expression 31]

$$\eta, \eta^3, \eta^5 \quad (31)$$

[Expression 32]

$$\int_{-\infty}^{\infty} e^{i\frac{\eta^2}{2\Delta t}} \eta \, d\eta = 0, \quad (32)$$

$$\int_{-\infty}^{\infty} e^{i\frac{\eta^2}{2\Delta t}} \eta^3 \, d\eta = 0,$$

$$\int_{-\infty}^{\infty} e^{i\frac{\eta^2}{2\Delta t}} \eta^5 \, d\eta = 0$$

As shown in the following Expression (33), when up to a first term of $\Delta t$ is taken into account, and a term containing $\eta^4$ is ignored with η being regarded as a small quantity, the following Expression (34) is derived.

[Expression 33]

$$\eta^2, \int_{-\infty}^{\infty} e^{i\frac{\eta^2}{2\Delta t}} \eta^2 d\eta, \sqrt{\frac{1}{2\pi i \Delta t}} \int_{-\infty}^{\infty} e^{i\frac{\eta^2}{2\Delta t}} \eta^2 d\eta = i\Delta t \quad (33)$$

[Expression 34]

$$\Psi(x, t + \Delta t) \approx \quad (34)$$

$$\sqrt{\frac{1}{2\pi i \Delta t}} \int_{-\infty}^{\infty} e^{i\frac{\eta^2}{2\Delta t}} \left[\Psi(x, t) + \frac{1}{2}\eta^2 \frac{\partial^2}{\partial x^2}\Psi(x, t)\right] e^{-i\Delta t V(x,t)} d\eta$$

Next, assuming that the space is a discrete space having a periodic boundary condition, the wave function is subject to Fourier series expansion as shown in the following Expression (35), where $k_n$ is given by the following Expression (36) and $x_j$ is given by the following Expression (37).

[Expression 35]

$$\Psi(x_j, t) = \sum_{n=-\frac{N_x}{2}}^{\frac{N_x}{2}-1} c_n e^{ik_n x_j} \quad (35)$$

-continued

[Expression 36]

$$k_n = \frac{2n\pi}{L_x} \quad (36)$$

[Expression 37]

$$x_j = h_x j \left( j = -\frac{N_x}{2}, \ldots, -1, 0, 1, \ldots, \frac{N_x}{2} - 1 \right) \quad (37)$$

$c_n$ is an expansion coefficient. $L_x$ is the size in the x direction, where $L_x = N_x h_x$. Subsequently, the size of the space grows at infinity, such that $L_x \to \infty$. For simplicity, $N_x$ is assumed to be an even number.

Further, applying the central difference approximation in the real-space finite-difference method to $\partial^2 \Psi(x, t)/\partial x^2$ yields the following Expression (38). From this, the time evolution of the wave function in the discrete space is indicated by the following Expression (39).

[Expression 38]

$$\frac{\partial^2}{\partial x^2} \Psi(x_j, t) \approx \frac{\Psi(x_j - h_x, t) - 2\Psi(x_j, t) + \Psi(x_j + h_x, t)}{h_x^2} \quad (38)$$

$$= \sum_n c_n \frac{1}{h_x^2} \left[ e^{ik_n(x_j - h_x)} - 2 e^{ik_n x_j} + e^{ik_n(x_j + h_x)} \right]$$

$$= \sum_n c_n \frac{1}{h_x^2} e^{ik_n x_j} \left[ e^{ik_n h_x} - 2 + e^{ik_n h_x} \right]$$

$$= \sum_n c_n \frac{-2}{h_x^2} e^{ik_n x_j} [1 - \cos(k_n h_x)]$$

[Expression 39]

$$\Psi(x_j, t + \Delta t) \approx \sum_n \sqrt{\frac{1}{2\pi i \Delta t}} \quad (39)$$

$$\int_{-\infty}^{\infty} e^{i \frac{\eta^2}{2\Delta t}} \left[ 1 - \frac{\eta^2}{h_x^2} [1 - \cos(k_n h_x)] \right] \times c_n e^{ik_n x_j} e^{-i\Delta t V(x_j, t)} d\eta$$

The use of the above Expression (28) allows the above Expression (39) to be approximated by the following Expression (40).

[Expression 40]

$$\Psi(x_j, t + \Delta t) \approx \sum_n \sqrt{\frac{1}{2\pi i \Delta t}} \int_{-\infty}^{\infty} e^{i \frac{\eta^2}{2\Delta t}} e^{-\frac{\eta^2}{h_x^2}[1-\cos(k_n h_x)]} \quad (40)$$

$$c_n e^{ik_n x_j} e^{-i\Delta t V(x_j, t)} d\eta$$

$$= \sum_n \sqrt{\frac{1}{2\pi i \Delta t}} \int_{-\infty}^{\infty} e^{i\frac{\eta^2}{2\Delta t} - \frac{\eta^2}{h_x^2}[1-\cos(k_n h_x)]}$$

$$c_n e^{ik_n x_j} e^{-i\Delta t V(x_j, t)} d\eta$$

$$= \sum_n \sqrt{\frac{1}{2\pi i \Delta t}} \int_{-\infty}^{\infty} e^{-i\eta^2 \left[ -\frac{1}{2\Delta t} \left[ 1 + 2i\Delta t \frac{1}{h_x^2} [1-\cos(k_n h_x)] \right] \right]}$$

$$c_n e^{ik_n x_j} e^{-i\Delta t V(x_j, t)} d\eta$$

By performing integration about $\eta$ according to an integral formula defined by the following Expression (41), the above Expression (40) can be approximated by the following Expression (42).

[Expression 41]

$$\int_{-\infty}^{\infty} e^{-ia\eta^2} d\eta = \sqrt{\frac{\pi}{ia}} \quad (41)$$

[Expression 42]

$$\Psi(x_j, t + \Delta t) \approx \sum_n \sqrt{\frac{1}{2\pi i \Delta t}} \quad (42)$$

$$\sqrt{\frac{-2\pi \Delta t}{i}} \left[ 1 + 2i\Delta t \frac{1}{h_x^2} [1 - \cos(k_n h_x)] \right]^{-\frac{1}{2}} \times c_n e^{ik_n x_j} e^{-i\Delta t V(x_j, t)}$$

Moreover, since $\Delta t$ is small, by using the above Expression (28) again, the above Expression (42) can be approximated by the following Expression (43).

[Expression 43]

$$\Psi(x_j, t + \Delta t) \approx \sum_n e^{-i\Delta t \frac{1}{h_x^2}[1-\cos(k_n h_x)]} c_n e^{ik_n x_j} e^{-i\Delta t V(x_j, t)} \quad (43)$$

Fourier expansion coefficient $c_n$ is given by the following Expression (44). Accordingly, the above Expression (43) is indicated by the following Expression (45).

[Expression 44]

$$c_n = \frac{1}{N_x} \sum_{j' = -\frac{N_x}{2}}^{\frac{N_x}{2} - 1} \Psi(x_{j'}, t) e^{-i\frac{2n\pi}{L_x} x_{j'}} \quad (44)$$

[Expression 45]

$$\Psi(x_j, t + \Delta t) = \frac{1}{N_x} \sum_n e^{-i\Delta t \frac{1}{h_x^2}[1-\cos(k_n h_x)]} \quad (45)$$

$$\sum_{j'} \Psi(x_{j'}, t) e^{-i\frac{2n\pi}{L_x} x_{j'}} e^{i\frac{2n\pi}{L_x} x_j} e^{-i\Delta t V(x_j, t)}$$

$$= \frac{1}{N_x} \sum_{j'} \sum_n e^{i\frac{2n\pi}{L_x}(x_j - x_{j'})} e^{-i\Delta t \frac{1}{h_x^2}[1-\cos(k_n h_x)]}$$

$$e^{-i\Delta t V(x_{j'}, t)} \Psi(x_{j'}, t)$$

Furthermore, by fixing $h_x$ and setting $N_x \to \infty$, that is, $L_x = h_x N_x \to \infty$, to change to representation in a discrete infinite space, the following Expression (46) is obtained. Here, the following Expressions (47) to (50) are taken into account.

[Expression 46]

$$\Psi(x_j, t + \Delta t) = \quad (46)$$

$$\sum_{j'} \frac{h_x}{2\pi} \int_{-\frac{\pi}{h_x}}^{\frac{\pi}{h_x}} e^{ik(x_j - x_{j'})} e^{-i\Delta t \frac{1}{h_x^2}[1-\cos(k_n h_x)]} e^{-i\Delta t V(x_{j'}, t)} \Psi(x_{j'}, t) dk$$

[Expression 47]

$$\frac{2\pi n}{N_x h_x} \to k \quad (47)$$

[Expression 48]

$$\frac{2\pi}{N_x h_x} \to dk \quad (48)$$

[Expression 49]

$$\sum_{n=-\frac{N_x}{2}}^{\frac{N_x}{2}-1} \to \int_{-\frac{\pi}{h_x}}^{\frac{\pi}{h_x}} \quad (49)$$

[Expression 50]

$$\frac{1}{N_x} = \frac{h_x}{2\pi} \frac{2\pi}{N_x h_x x} \quad (50)$$
$$= \frac{h_x}{2\pi} dk$$

As a result of further performing integration variable transformation $\theta = h_x k$, the above Expression (46) is indicated by the following Expression (51).

[Expression 51]

$$\Psi(x_j, t + \Delta t) = \sum_{j'} \frac{1}{2\pi} \int_{-\pi}^{\pi} e^{i\theta(j-j')} e^{-i\Delta t \frac{1}{h_x^2}(1-\cos\theta)} \quad (51)$$
$$e^{-i\Delta t V(x_j,t)} \Psi(x_{j'}, t) d\theta$$
$$= \sum_{j'} \frac{1}{\pi} \int_0^{\pi} \cos(j-j')\theta e^{-i\Delta t \frac{1}{h_x^2}(1-\cos\theta)}$$
$$e^{-i\Delta t V(x_j,t)} \Psi(x_{j'}, t) d\theta$$

By employing Hansen's integral representation of the Bessel function as shown in the following Expression (52), the above Expression (51) is indicated by the following Expression (53).

[Expression 52]

$$J_n(z) = \frac{1}{\pi i^n} \int_0^{\pi} [\cos n\theta] e^{iz\cos\theta} \quad (52)$$

[Expression 53]

$$\Psi(x_j, t + \Delta t) = \sum_{j'} i^{j-j'} e^{-i\frac{\Delta t}{h_x^2}} J_{j-j'}\left(\frac{\Delta t}{h_x^2}\right) e^{-i\Delta t V(x_j,t)} \Psi(x_{j'}, t) \quad (53)$$

$J_n$ is the Bessel function, and is given by the above Expression (7). Integration about y and z is the same as above. In the three-dimensional space, the above Expression (23) is represented by the following Expression (54).

[Expression 54]

$$\Psi(r_j, t + \Delta t) = \quad (54)$$
$$\sum_{j_x'} \sum_{j_y'} \sum_{j_z'} \left[ \prod_{l=x,y,z} i^{j_l - j_l'} e^{-i\frac{\Delta t}{h_l^2}} J_{j_l - j_l'}\left(\frac{\Delta t}{h_l^2}\right) \right] \times e^{-i\Delta t V(r_j,t)} \Psi(r_j', t)$$

Note that the present invention can also apply the following difference approximation in the real-space finite-difference method when executing the integration of the above Expression (5).

[Expression 55]

$$\frac{\partial^2}{\partial x^2} \psi(x_j, t) = \sum_{n=-N_f}^{N_f} c_n \psi(x_j + nh_x, t) + O((h_x)^{2N+2})$$

$N_f$ is an approximation order, and $c_n$ is a weighting coefficient.

In particular, in the case of a simplest central difference approximation, the following Expression (56) applies.

[Expression 56]

$$\frac{\partial^2}{\partial x^2} \psi(x_j, t) \approx \frac{\psi(x_{j+1}, t) - 2\psi(x_j, t) + \psi(x_{j-1}, t)}{h_x^2}$$

The wave function after short time period $\Delta t$ can be written as the following Expression (57) using the Bessel function (for example, see Non-patent Reference 3 (Chelikowsky J R, Troullier N, Wu K and Saad Y, Phys. Rev. B, 50(16), 11355 (1994)).

[Expression 57]

$$\psi(r_j, t + \Delta t) = e^{-i\frac{\Delta t}{2} V(r_j, t + \frac{\Delta t}{2})}$$
$$\sum_{j_x'} \sum_{j_y'} \sum_{j_z'} \left[ \prod_{\nu=x,y,z} i^{j_\nu - j_\nu'} e^{-i\frac{\Delta t}{h_\nu^2}} J_{j_\nu - j_\nu'}\left(\frac{\Delta t}{h_\nu^2}\right) \right] \times e^{-i\frac{\Delta t}{2} V(r_{j'}, t + \frac{\Delta t}{2})} \psi(r_{j'}, t)$$

Expression (58) in the above Expression (57) is the same Bessel function as the above Expression (7). In addition, the same condition of Expression (59) as the above Expressions (8) and (9) is satisfied.

[Expression 58]

$$J_n(x) = \sum_{s=0}^{\infty} \frac{(-1)^s (x/2)^{n+2s}}{s!(n+s)!}$$

[Expression 59]

$$r_j = (h_x j_x, h_y j_y, h_z j_z),$$
$$r_{j'} = (h_x j_x', h_y j_y', h_z j_z')$$

where $h_\nu$ is a space step size in the $\nu$ direction, and $j_\nu$ and $j_\nu'$ are integers.

Meanwhile, in the case of using a difference approximation of the order $N_f$, the following Expression (60) applies.

[Expression 60]

$$\psi(r_j, t+\Delta t) = \frac{1}{\pi^3} e^{-i\frac{\Delta t}{2}V(r_j, t+\frac{\Delta t}{2})} \times \sum_{j'_x}\sum_{j'_y}\sum_{j'_z}\left[\prod_{v=x,y,z}\int_0^\pi [\cos(j_v - j'_v)\theta]\exp\left(i\frac{\Delta t}{\hbar_v^2}\sum_{l=0}^{N_f} c_l\left(1-\frac{1}{2}\delta_{l0}\right)\cos(l\theta)\right)d\theta\right] \times e^{-i\frac{\Delta t}{2}V(r_{j'}, t+\frac{\Delta t}{2})}\psi(r_{j'}, t)$$

As described above, Bessel function $J_{j-j'}(x)$ rapidly decays with increasing $|j-j'|$ as shown in FIG. 4, so that summation can be stopped at such a small term that does not influence a calculation result. This contributes to a significant reduction in computational complexity for the integration of Expression (5), that is, for obtaining a sum about J' in Expression (57). Thus, numerical calculations can be performed with high speed.

On the other hand, consider the case of the direct integration of Expression (5). The integrand of Expression (5) is given by Expression (61).

[Expression 61]

$$\exp[i(r-r')^2/2\Delta t]$$

This being so, for example the integrand for the integration of x' is given by Expression (62).

[Expression 62]

$$\exp[i(x-x')^2/2\Delta t]$$

The above Expression (62) is a vibrational function (trigonometric function) for x'. As can be understood from its real part shown in FIG. 4, there is no decay with increasing x', and so integration needs to be performed over an extremely wide range. Therefore, the correct result can be obtained by using Expression (57), in the same way as described above.

In addition, in the present invention it is possible to extend to a calculation method of finding a "steady-state solution not dependent on time" in a discrete eigenvalue problem with high speed, by applying the concept of "imaginary time evolution" to Expression (57). A time evolution propagator can be written as Expression (63) same as the above Expression (19), using eigenfunction $\Phi_i(r)$ and eigenvalue $E_i$ of a system in question.

[Expression 63]

$$K(r, t; r', t_0) = \sum_i \phi_i(r)\phi_i^*(r')e^{-iE_i(t-t_0)}$$

Integrating for r where r'=r yields Expression (64) same as the above Expression (20), due to orthonormality of the eigenfunction.

[Expression 64]

$$\int_{-\infty}^\infty d^3 r K(r, t; r, t_0) = \int_{-\infty}^\infty d^3 r \sum_i \phi_i(r)\phi_i^*(r)e^{-iE_i(t-t_0)} = \sum_i e^{-iE_i(t-t_0)}$$

Furthermore, by formally introducing imaginary time T=it and evolving over a sufficiently long imaginary time, that is, T→∞, Expression (65) same as the above Expression (21) is obtained because the term of lowest energy $E_0$ decays most slowly.

[Expression 65]

$$\lim_{\tau\to\infty}\int_{-\infty}^\infty d^3 r K(r, -i\tau; r, -i\tau_0) \approx e^{-E_0(\tau-\tau_0)}$$

This demonstrates that a discrete eigenstate can be obtained by imaginary time evolution calculations, which is a well-known calculation method.

Applying the numerical calculation method of Expression (57) to the above concept leads to Expression (66).

[Expression 66]

$$\psi(r_j, -i(\tau+\Delta\tau)) = e^{-\frac{\Delta\tau}{2}V(r_j, t+\frac{\Delta t}{2})}\sum_{j'_x}\sum_{j'_y}\sum_{j'_z}\left[\prod_{v=x,y,z} i^{j_v-j'_v} e^{-\frac{\Delta t}{\hbar_v^2}} J_{j_v-j'_v}\left(-i\frac{\Delta\tau}{\hbar_v^2}\right)\right] \times e^{-\frac{\Delta\tau}{2}V(r_{j'}, t+\frac{\Delta t}{2})}\psi(r_{j'}, -i\tau)$$

Furthermore, by using Expression (67) about a relation between Bessel function $J_n(x)$ and modified Bessel function $I_n(x)$, Expression (68) is obtained.

[Expression 67]

$$J_n(-ix) = (-i)^n I_n(x)$$

[Expression 68]

$$\psi(r_j, -i(\tau+\Delta\tau)) = e^{-\frac{\Delta\tau}{2}V(r_j, t+\frac{\Delta t}{2})} \times \sum_{j'_x}\sum_{j'_y}\sum_{j'_z}\left[\prod_{v=x,y,z} e^{-\frac{\Delta\tau}{\hbar_v^2}} I_{j_v-j'_v}\left(\frac{\Delta\tau}{\hbar_v^2}\right)\right] e^{-\frac{\Delta\tau}{2}V(r_{j'}, t+\frac{\Delta t}{2})}\psi(r_{j'}, -i\tau)$$

This makes it possible to calculate imaginary time evolution with high speed, so that the ground state wave function can be obtained with high speed and precision. Moreover, the excited state can be calculated as well, by using the initial wave function orthogonal to the ground state wave function.

On the other hand, in the case of using the high-order difference approximation shown in the above Expressions (55) to (62), the following Expression (69) applies.

[Expression 69]

$$\psi(r_j, -i(\tau+\Delta\tau)) = \frac{1}{\pi^3} e^{-\frac{\Delta\tau}{2}V(r_j, t+\frac{\Delta t}{2})} \times \sum_{j'_x}\sum_{j'_y}\sum_{j'_z}\left[$$

-continued $$\prod_{\nu=x,y,z}\int_0^\pi [\cos(j_\nu - j'_\nu)\theta]\exp\left(\frac{\Delta\tau}{\hbar_\nu^2}\sum_{l=0}^{N_f}\left(1-\frac{1}{2}\delta_{l0}\right)c_l\cos(l\theta)\right)d\theta\right] \times$$

$$e^{-\frac{\Delta\tau}{2}V(r_{j'},t+\frac{\Delta t}{2})}\psi(r_{j'},-i\tau)$$

Other Variations

Note that the numerical simulation apparatus 100 may be provided with a Central Processing Unit (CPU), a Random Access Memory (RAM), a Read Only Memory (ROM), a Hard Disk Drive (HDD), a network adaptor, and the like. A program for controlling the numerical simulation apparatus 100 (hereafter referred to as a numerical simulation program) may be installed on the HDD or the like, so that each function of the numerical simulation apparatus 100 can be realized by executing the numerical simulation program.

Moreover, the numerical simulation apparatus 100 may be constituted by a plurality of computer systems. In such a case, the plurality of computer systems may be used as one composition computer system, like grid computing.

Moreover, the numerical simulation apparatus 100 may be composed of a front end and a back end. In such a case, the initial value, the calculation condition, and the instruction data are received from the operator in the front end, and the real time evolution calculation process, the imaginary time evolution calculation process, the frequency analysis process, the physical property calculation process, and the like are executed using the received initial value, calculation condition, and instruction data in the back end.

Moreover, the numerical simulation program may be recorded on a recording medium that is readable by a hardware system such as a computer system or an embedded system. The numerical simulation program may also be read and executed on another hardware system via the recording medium, as a result of which each function of the numerical simulation apparatus 100 can be realized on another hardware system. Examples of the recording medium readable on a computer system include an optical recording medium (for example, a CD-ROM), a magnetic recording medium (for example, a hard disk), a magneto-optical recording medium (for example, an MO), and a semiconductor memory (for example, a memory card).

Moreover, the numerical simulation program may be held in a hardware system connected to a network such as an internet, a local area network, or the like. The numerical simulation program may also be downloaded and executed on another hardware system via the network, as a result of which each function of the numerical simulation apparatus 100 can be realized on another hardware system. Examples of the network include a terrestrial broadcasting network, a satellite broadcasting network, Power Line Communication (PLC), a mobile telephone network, a wired communication network (for example, IEEE 802.3), and a wireless communication network (for example, IEEE 802.11).

Moreover, the numerical simulation apparatus 100 may be realized by an LSI that includes each function of the numerical simulation apparatus 100.

The LSI may be realized by a full-custom Large Scale Integration (LSI), a semi-custom LSI such as an Application Specific Integrated Circuit (ASIC), a programmable logic device such as a FPGA or a CPLD, or a dynamic reconfigurable device that enables a circuit structure to be changed dynamically.

Moreover, design data for implementing each processor function on the LSI may be a program (hereafter referred to as an HDL program) written in a hardware description language. The design data may also be a gate-level netlist obtained by logical synthesis of the HDL program. The design data may also be macro cell information in which placement information, process conditions, and the like are added to the gate-level netlist. The design data may also be mask data specifying dimensions, timings, and the like. Examples of the hardware description language include Very high speed integrated circuit Hardware Description Language (VHDL), Verilog-HDL, SystemC, and the like.

Moreover, the design data may be recorded on a recording medium that is readable by a hardware system such as a computer system or an embedded system. The design data may also be read and executed on another hardware system via the recording medium. The design data read on another hardware system via the recording medium may be downloaded to a programmable logic device via a download cable. Examples of the recording medium readable on a computer system include an optical recording medium (for example, a CD-ROM), a magnetic recording medium (for example, a hard disk), a magneto-optical recording medium (for example, an MO), and a semiconductor memory (for example, a memory card).

The design data may also be held in a hardware system connected to a network such as an internet, a local area network, or the like. The design data may also be downloaded and executed on another hardware system via the network. The design data acquired on another hardware system via the network may be downloaded to a programmable logic device via a download cable. Examples of the network include a terrestrial broadcasting network, a satellite broadcasting network, PLC, a mobile telephone network, a wired communication network (for example, IEEE 802.3), and a wireless communication network (for example, IEEE 802.11).

The design data may also be recorded on a serial ROM so as to be transferred to an FPGA upon activation. The design data recorded on the serial ROM may be directly downloaded to the FPGA upon activation.

Alternatively, the design data may be generated by a microprocessor and downloaded to the FPGA upon activation.

INDUSTRIAL APPLICABILITY

The present invention can be used as a numerical simulation apparatus and the like needed for developing electronic devices or quantum computers in consideration of nanoscale properties, and in particular as a numerical simulation apparatus and the like capable of executing a numerical simulation with high speed and precision by reducing computational complexity.

The invention claimed is:

1. A numerical simulation apparatus that executes a numerical simulation using a second wave function which is a solution of a time dependent Schrödinger equation, said numerical simulation apparatus comprising:
a time evolution calculation unit configured to calculate a result of the second wave function at a plurality of times from an initial time in increments of a predetermined time period according to a time evolution calculation of the second wave function, wherein the result of the second wave function at each time is obtained by applying a central difference approximation in a real-space finite-difference method to a first wave function expressed using a propagator, and the time evolution calculation is performed using a Bessel function; and a calculation result storage unit configured to store the result of the second wave function obtained at each time by said time evolution calculation unit while evolving the second wave function in increments of the predetermined time period.

2. The numerical simulation apparatus according to claim 1, further comprising:
an initial wave function storage unit configured to store a pulse function as the second wave function at the initial time; and
a frequency analysis unit configured to calculate a steady-state solution of a scattering problem for predetermined energy, by performing a frequency analysis of the second wave function for the predetermined energy using the calculation result of the second wave function obtained by said time evolution calculation unit from the pulse function stored in said initial wave function storage unit.

3. The numerical simulation apparatus according to claim 1,
wherein said time evolution calculation unit is configured to calculate imaginary time evolution of the second wave function, using imaginary time that is obtained by multiplying time by an imaginary number.

4. The numerical simulation apparatus according to claim 1, further comprising
an absorbing boundary condition storage unit configured to store an absorption coefficient weighted so as to absorb an influence that is exerted on a model by the wave function in a boundary region of the model, the model being subject to the numerical simulation,
wherein said time evolution calculation unit is configured to calculate the time evolution of the second wave function using the absorption coefficient stored in said absorbing boundary condition storage unit.

5. A numerical simulation method for executing a numerical simulation using a second wave function which is a solution of a time dependent Schrödinger equation, said numerical simulation method comprising:
calculating a result of the second wave function at a plurality of times from an initial time in increments of a predetermined time period according to a time evolution calculation of the second wave function, wherein the result of the second wave function at each time is obtained by applying a central difference approximation in a real-space finite-difference method to a first wave function expressed using a propagator, and the time evolution calculation is performed using a Bessel function; and
storing the result of the second wave function obtained at each time in said calculating while evolving the second wave function in increments of the predetermined time period.

6. A non-transitory computer readable recording medium having stored thereon a numerical simulation program for causing a computer system to execute a numerical simulation using a second wave function which is a solution of a time dependent Schrödinger equation, wherein, when executed, said numerical simulation program causes the computer system to execute a method comprising:
calculating a result of the second wave function at a plurality of times from an initial time in increments of a predetermined time period according to a time evolution calculation of the second wave function, wherein the result of the second wave function at each time is obtained by applying a central difference approximation in a real-space finite-difference method to a first wave function expressed using a propagator, and the time evolution calculation is performed using a Bessel function; and
storing the result of the second wave function obtained at each time in said calculating while evolving the second wave function in increments of the predetermined time period.

* * * * *